US008702508B2

(12) United States Patent
Gura et al.

(10) Patent No.: US 8,702,508 B2
(45) Date of Patent: Apr. 22, 2014

(54) COMMUNITY GAME THAT ADAPTS COMMUNAL GAME APPEARANCE

(75) Inventors: Damon E. Gura, Chicago, IL (US); Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

(21) Appl. No.: 13/592,461

(22) Filed: Aug. 23, 2012

(65) Prior Publication Data

US 2013/0084965 A1 Apr. 4, 2013

Related U.S. Application Data

(60) Provisional application No. 61/622,906, filed on Apr. 11, 2012, provisional application No. 61/541,939, filed on Sep. 30, 2011.

(51) Int. Cl.
*A63F 13/00* (2006.01)

(52) U.S. Cl.
USPC .................................................. 463/31; 463/33

(58) Field of Classification Search
CPC ................ A36F 2300/6661; A36F 2300/6669; A36F 2300/8023; G07F 17/3262; G07F 17/3272; G07F 17/3274
USPC ........................................................ 463/31, 33
See application file for complete search history.

(56) References Cited

U.S. PATENT DOCUMENTS 4,805,907 A * 2/1989 Hagiwara ........................ 463/26
5,669,817 A * 9/1997 Tarantino ........................ 463/13
6,319,125 B1 11/2001 Acres
6,358,149 B1 3/2002 Schneider et al.
6,966,837 B1 * 11/2005 Best ................................ 463/33
7,326,117 B1 * 2/2008 Best ................................ 463/32
7,662,040 B2 2/2010 Englman et al.
7,780,531 B2 8/2010 Englman et al.
7,833,094 B2 11/2010 Englman et al.
8,057,294 B2 11/2011 Pacey et al.
8,057,295 B2 11/2011 Vann et al.
8,092,297 B2 1/2012 Decasa et al.
8,109,821 B2 * 2/2012 Kovacs et al. ................... 463/16
2003/0119581 A1 * 6/2003 Cannon et al. .................. 463/25
2003/0148804 A1 * 8/2003 Ikeya et al. ..................... 463/16
(Continued)

FOREIGN PATENT DOCUMENTS

WO 2007/030675 3/2007
WO 2007/047977 4/2007
(Continued)

*Primary Examiner* — Dmitry Suhol
*Assistant Examiner* — David Duffy
(74) *Attorney, Agent, or Firm* — Nixon Peabody LLP

(57) ABSTRACT

A community game that adapts a scene on a community display based on the number of participating players and/or player locations from one session of the community game to another or in any given session and/or number of the gaming terminals. Selectable elements are displayed on the community display for selection by the participating players. When additional players are eligible to participate in the community game, a field of view or a virtual camera angle of a scene is changed to reveal additional selectable elements or a greater variety of selectable elements than were available for selection with fewer participating players. Any of the selectable elements can be cooperatively selectable elements which multiple players can select to reveal an enhanced award. Based on the players' locations, the scene can be adapted to portray selectable elements or previously hidden or obscured areas of the scene closest to the newly participating player(s).

17 Claims, 15 Drawing Sheets

(56) References Cited

U.S. PATENT DOCUMENTS

| | | | |
|---|---|---|---|
| 2009/0093298 | A1 | 4/2009 | Michel |
| 2010/0041464 | A1 | 2/2010 | Arezina et al. |
| 2010/0222123 | A1 | 9/2010 | Hornik |
| 2010/0234090 | A1 | 9/2010 | Thomas |
| 2010/0267439 | A1 | 10/2010 | Englman et al. |
| 2010/0279764 | A1 | 11/2010 | Allen et al. |
| 2010/0317424 | A1 | 12/2010 | Hornik et al. |
| 2010/0317442 | A1 | 12/2010 | Thomas et al. |
| 2011/0034239 | A1 * | 2/2011 | Collette et al. .................. 463/26 |
| 2011/0065495 | A1 | 3/2011 | Hornik et al. |
| 2011/0070940 | A1 | 3/2011 | Jaffe et al. |
| 2011/0105233 | A1 | 5/2011 | Aoki |
| 2011/0130192 | A1 | 6/2011 | Englman et al. |
| 2011/0300926 | A1 | 12/2011 | Englman et al. |

FOREIGN PATENT DOCUMENTS

| | | |
|---|---|---|
| WO | 2008/045398 | 4/2008 |
| WO | 2008/133850 | 11/2008 |
| WO | 2009/061383 | 5/2009 |
| WO | 2011/139716 | 11/2011 |

* cited by examiner

COMMUNITY GAME THAT ADAPTS COMMUNAL GAME APPEARANCE

CROSS REFERENCE TO RELATED APPLICATIONS

This application claims the benefit of U.S. Provisional Patent Application No. 61/622,906, filed Apr. 11, 2012, entitled "Community Game that Adapts Communal Game Appearance" and U.S. Provisional Patent Application No. 61/541,939, filed Sep. 30, 2011, entitled "Community Game that Adapts Communal Game Appearance based on Number of Players," both of which are hereby incorporated by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to wagering games, and methods for playing wagering games, and more particularly, to a community game that adapts the scene or selectable elements displayed in the scene based on the number of participating players and/or the number or location of the gaming terminals of the participating players.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

In multi-player wagering games, would-be players need to be encouraged and incentivized to participate in community games. Onlookers of a community game in progress need to feel that their participation will enhance their chances of winning an award, more so than if they were to play a wagering game individually. These and other unfulfilled needs are addressed by the present disclosure.

SUMMARY OF THE INVENTION

Some aspects disclosed herein relate to a community game that automatically and adaptively alters a scene displayed on a community display based on the number of players that are eligible to participate in the community game and/or the locations of the gaming terminals of the participating players either from one session of a community game to another session of the community game or within or during the same session of a community game. As the number of eligible players changes for any given session of a community game, the community game automatically and adaptively changes the field of view or the virtual camera angle of a scene depicted on the community display or changes the number and variety of selectable elements in the community game or places the selectable elements or alters the scene so that the selectable elements or the scene is oriented or placed near the participating players. The minimum number of players that can participate in a community game is one, and the maximum number of players can be, for example, four, six, or eight.

By way of example, when a community game has only one participating player, the scene portrayed on the community display has a relatively narrow field of view and depicts just a few selectable elements on the community display. However, if at a subsequent time another session of the community game is triggered, there are three participating players, the scene is altered so that the field of view is expanded or the virtual camera angle is changed to reveal a larger quantity of selectable elements compared to the community game in which only one player participated and more features of the scene. The number of selectable elements can be commensurate with the number of participating players, such as for example, the ratio between selectable elements and the number of participating players can be directly proportional, linear, or approximately linear. The scene in the community game can portray richer or more dense graphics as the number of participating players increases. The selectable elements optionally do not scale, but rather remain a fixed size so that they can be selected by the players. For example, if the field of view expands, the selectable elements, if scaled proportionally to the expanded field of view, would shrink, making them more difficult to be selected by the participating players. To avoid this potential source of frustration for the participating players, the size of the selectable elements does not diminish even as the field of view expands or the virtual camera zooms out from scene to scene.

Likewise, if a given session of a community game has only one participating player, the selectable elements on the community display are selectable by a single player only. However, if another session of the community game has three participating players, the community game can alter the selectable elements to be cooperatively selectable elements or can add cooperatively selectable elements or replace the existing selectable elements with cooperatively selectable elements. In this manner, the community game self-adapts the variety or type of selectable elements based on the number of participating players. A cooperatively selectable element is represented as a feature, object, or symbol displayed on the community game and is selectable by more than one player. A cooperative award is associated with a cooperatively selectable element, and such cooperative award can be shared with all of the participating players, only a selected one of the participating players, or only those participating players who selected the cooperatively selectable element.

Depending on the number and locations of the gaming terminals of the players participating in a community game, the community game can self-adapt the community display so that the selectable elements or the central focus of the scene is centered around the gaming terminals of the participating players. If a bank of eight gaming terminals are arranged before a central community display, if a player at one end of the bank is the sole participant in the community game, it would be undesirable for that player to have to select elements displayed on the other end of the community display, far away from where the player is situated at the gaming terminal. Likewise, if the scene is altered as a result of a changing number of players from one community game session to another, it would be undesirable for the central focus or the momentum of that scene to be displayed far away on the community display from the gaming terminal(s) of the participating player(s). Thus, aspects of the present disclosure automatically alter the placement of the selectable elements on the community display or the scene or the type of scene based on the number of participating players and the locations of their associated gaming terminals.

For example, when a session of the community game has only one participating player, the selectable elements depicted on the community display can be positioned closest to the gaming terminal of the participating player. By closest, it is meant that the distance between the gaming terminal of the participating player and the selectable element is shortest relative to the distance between other gaming terminals in a bank of gaming terminals. When another session of the community game has three participating players in a bank of eight gaming terminals, the selectable elements (some or all of which can be cooperatively selectable elements) are placed or positioned on the community display to be closest to the participating players. Few or none of the selectable elements are placed near the gaming terminals of non-participating players. Alternately or additionally, when the field or view or virtual camera angle of the scene is changed as a result of the increased number of participating players, the altered scene can display objects or features or symbols closest to the participating players' gaming terminals. By way of example only, if the scene depicted is a bowling theme with eight bowling alleys, a bowling alley would be shown to be active on the community display for each of the three participating players, but for the other five non-participating players, their corresponding bowling alley can be darkened.

A computer-implemented method is also disclosed that includes configuring, by one or more controllers, a bank of networked gaming terminals to be eligible to participate in a first community game; and in response to adding one or more gaming terminals to, or subtracting one or more gaming terminals from, the bank of networked gaming terminals, reconfiguring, by at least one of the one or more controllers, the bank of networked gaming terminals to be eligible to participate in a second community game different from the first community game. When the bank is configured to be eligible to participate in the first community game, the method can further include triggering the first community game during play of one or more wagering games played via the bank of networked gaming terminals and displaying the first community game on at least one display device. When the bank is configured to be eligible to participate in the second community game, the method can further include triggering the second community game during play of the one or more wagering games played via the bank of networked gaming terminals and displaying the second community game on the at least one display device.

The first community game and the second community game can be of different types. The types can be a non-competition type, an individual competition type, or a team competition type.

In an example, the bank of networked gaming terminals can include at least four gaming terminals with respect to the team competition type of community game. Game content available for presentation in the second community game can be unavailable for presentation in the first community game. Alternately or additionally, a game play mechanic available for use in the second community game can be unavailable for use in the first community game.

When the bank is configured to be eligible to participate in the first community game, the gaming terminals in the bank are arranged in a first physical arrangement. In response to adding one or more gaming terminals to, or subtracting one or more gaming terminals from, the bank of networked gaming terminals, the method can further include rearranging the gaming terminals in the bank to be arranged in a second physical arrangement different from the first physical arrangement. The first physical arrangement and the second physical arrangement can be of different types, for example, a back-to-back arrangement, a side-by-side linear arrangement, a side-by-side curved arrangement, or a circular arrangement.

According to an aspect of the present disclosure, a method of adapting a community game based on the number of participating players is disclosed. The method includes: receiving at a controller a first indication that a first player is eligible to participate in a first session of a community game having a theme and a selectable element and configured to be played by multiple participating players, the controller configuring the selectable element to be selectable by the first player; displaying on one or more video displays at least a portion of the first session of the community game including a scene portraying respective images related to the theme and representative of the selectable element; receiving at the controller a second indication that a plurality of players are eligible to participate in a second session of the community game; responsive to receiving the second indication, portraying a cooperatively selectable element in the scene of the second session on the one or more video displays; receiving a first input from the first player indicating that the first player has selected the cooperatively selectable element in the second session; receiving a second input from the second player indicating that the second player has selected the cooperatively selectable element in the second session; and responsive to receiving the first and second inputs, providing a cooperative award to the first player, or to the second player, or to both in the second session.

The method can further include providing a personal award to the first player in the first session, the personal award having a diminished value relative to the cooperative award in the second session. The cooperatively selectable element can be selectable and displayed on the one or more video displays only if the first and the second players are eligible to participate in the second session of the community game. The method can further include, responsive to receiving the second indication, reconfiguring the selectable element from the first session to be the cooperatively selectable element in the second session.

In the first session, the cooperatively selectable element can be hidden or obscured from the scene displayed on the one or more video displays. The method can further include displaying the cooperatively selectable element in the scene of the second session. A selectable area of the selectable element can coincide with a corresponding selectable area of the cooperatively selectable element in the scene. The first and second inputs can be received from handheld devices held by the first and second players, respectively.

The method can further include, responsive to receiving the first input and prior to receiving the second input, altering a graphic corresponding to the cooperatively selectable element to indicate to the second player that the cooperatively selectable element is available for selection by the second player in the second session.

According to another aspect of the present disclosure, a method of adapting a community game based on the number of gaming terminals linked together is disclosed. The method includes: determining, by a controller, a number of gaming terminals that are communicatively linked together to provide a community game on one or more displays controlled by each of the number of gaming terminals or by the controller; displaying on the one or more displays the community game having a first game category type and a first set of functionality and content features; detecting, by the controller or another controller, that one or more additional gaming terminals are added as being communicatively linked to the number of gaming terminals; responsive to the detecting, the controller or the other controller changing the first game category type to a second game category type or the first set of functionality and content features to a second set of functionality and content features, wherein the second game category type differs from the first game category type and the second set of functionality and content features differs from the first set of functionality and content features insofar as the second set of functionality and content features has at least one functionality or content feature that is enhanced relative to the first set of functionality and content features, wherein the changing results in a modified community game having the second game category type or the second set of functionality and content features; and the controller or the other controller causing the modified community game to be displayed on the one or more displays.

The number of gaming terminals can be two and can include a first gaming terminal and a second gaming terminal arranged back-to-back relative to one another such that the one or more displays are two displays in the first and second gaming terminals, respectively, and face away from one another. The first game category type can be a competitive game in which players at the first and second gaming terminals compete against each other for an award in the community game.

The changing can include rearranging the two gaming terminals side-by-side and adding a third gaming terminal side-by-side such that the one or more displays are at least three displays in the first, second, and third gaming terminals, respectively, the three displays being arranged side-by-side to form visually a single, substantially seamless display spanning across the first, second, and third gaming terminals. The second game category type can be a cooperative game in which first, second, and third players at the first, second, and third gaming terminals, respectively, cooperate with one another to achieve an award in the modified community game.

The number of gaming terminals can be two and can include a first gaming terminal and a second gaming terminal arranged side-by-side such that the one or more displays are two displays in the first and second gaming terminals, respectively. The two displays can be arranged side-by-side. The first game category type can be a competitive game in which players at the first and second gaming terminals compete against each other for an award in the community game. The changing can include adding a third gaming terminal side-by-side the first and second gaming terminals to form visually a single, substantially seamless display spanning across the first, second, and third gaming terminals. The second game category type can be a cooperative game in which first, second, and third players at the first, second, and third gaming terminals, respectively, cooperate with one another to achieve an award in the modified community game.

The changing can include adding a further gaming terminal side-by-side the first, second, and third gaming terminals. The second game category type can be a team game in which first and second players at the first and second gaming terminals form a first team and third and fourth players at the third and further gaming terminals form a second team that competes against the first team to achieve a team award in the modified community game.

The number of gaming terminals can be two and can include a first gaming terminal and a second gaming terminal. The first game category type can be a competitive game in which players at the first and second gaming terminals compete against each other for an award in the community game. The changing can include adding a third gaming terminal and a fourth gaming terminal. The second game category type can be a cooperative game in which first, second, third, and fourth players at the first, second, third, and fourth gaming terminals, respectively, cooperate with one another to achieve an award in the modified community game. A minimum number of four gaming terminals can be required to change the first game category type to the second game category type.

The second set of functionality and content features can include a new bonus game that is not available in the first set of functionality and content features. The second set of functionality and content features can include a new multiplier that is not available in the first set of functionality and content features. The new multiplier can be applied to awards accumulated by each player of the modified community game.

The second set of functionality and content features can include one or more new symbols each associated with a randomly selected outcome, none of the symbols being available in the first set of functionality and content features. Awards associated with the one or more new symbols can have a higher value compared to awards associated with symbols in the first set of functionality and content features.

The first set of functionality and content features can include game content that is unavailable in the community game but the game content in the second set of functionality and content features is available in the modified community game. The first set of functionality and content features of the community game can correspond to a standalone community game. Responsive to a predetermined number of the one or more additional gaming terminals being communicatively linked together to the number of gaming terminals, the second set of functionality and content features of the modified community game can correspond to a portal community game available over a communications network.

The first set of functionality and content features of the community game can correspond to a community game that lacks a metagame ruleset, whereas the second set of functionality and content features of the modified community game correspond to a community game having a metagame ruleset that uses out-of-game information or resources to affect in-game decisions. The out-of-game information or resources can correspond to information or resources that are external to the modified community game and the in-game decisions can correspond to decisions made within the modified community game.

Additional aspects of the invention will be apparent to those of ordinary skill in the art in view of the detailed description of various embodiments, which is made with reference to the drawings, a brief description of which is provided below.

DETAILED DESCRIPTION

Figure 1:
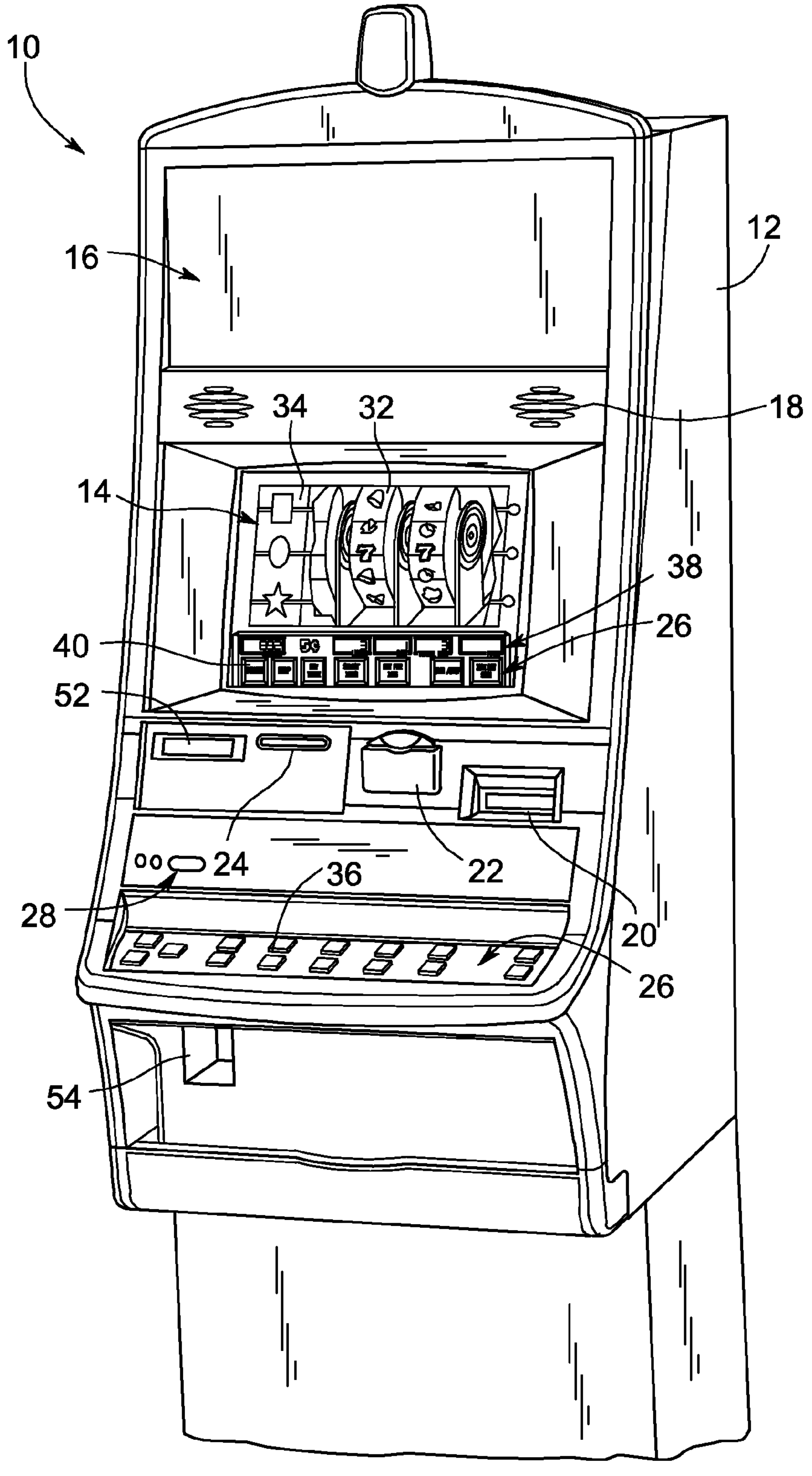
FIG. 1 (PRIOR ART)
FIG. 1 is a perspective view of a free-standing gaming terminal according to an embodiment of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is be an electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 10 is shown as a free-standing terminal of the upright type, the gaming terminal is readily amenable to implementation in a wide variety of other forms such as a free-standing terminal of the slant-top type, a portable or handheld device primarily used for gaming, such as is disclosed by way of example in PCT Patent Application No. PCT/US2007/000792 filed Jan. 11, 2007, titled "Handheld Device for Wagering Games," which is incorporated herein by reference in its entirety, a mobile telecommunications device such as a mobile telephone or personal digital assistant (PDA), a counter-top or bar-top gaming terminal, or other personal electronic device, such as a portable television, MP3 player, entertainment device, etcetera.

The gaming terminal 10 illustrated in FIG. 1 comprises a cabinet or housing 12. For output devices, this embodiment of the gaming terminal 10 includes a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, emails, alerts or announcements, broadcast information, subscription information, etc. appropriate to the particular mode(s) of operation of the gaming terminal. For input devices, the gaming terminal 10 illustrated in FIG. 1 includes a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements exist and are readily utilizable in any number of combinations to create various forms of a gaming terminal in accord with the present concepts.

The primary display area 14 include, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10, or other form factor, such as is shown by way of example in FIG. 1. The primary display area 14 includes, in relation to many aspects of wagering games conducted on the gaming terminal 10, one or more paylines 30 (see FIG. 3) extending along a portion of the primary display area. In the illustrated embodiment of FIG. 1, the primary display area 14 comprises a plurality of mechanical reels 32 and a video display 34, such as a transmissive display (or a reflected image arrangement in other embodiments), in front of the mechanical reels 32. If the wagering game conducted via the gaming terminal 10 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 10 relies only upon the mechanical reels 32, but not the video display 34, the video display 34 depicted in FIG. 1 is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the gaming terminal 10), streamed (e.g., from a gaming network), or received as a TV signal (e.g., either broadcast or via cable) and such images can take different forms, such as animated images, computer-generated images, or "real-life" images, either prerecorded (e.g., in the case of marketing/promotional material) or as live footage. The format of the video images can include any format including, but not limited to, an analog format, a standard digital format, or a high-definition (HD) digital format.

The player-input or user-input device(s) 26 include, by way of example, a plurality of buttons 36 on a button panel, as shown in FIG. 1, a mouse, a joy stick, a switch, a microphone, and/or a touch screen 38 mounted over the primary display area 14 and/or the secondary display area 16 and having one or more soft touch keys 40, as is also shown in FIG. 1. In still other aspects, the player-input devices 26 comprise technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 10 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354, published on Mar. 6, 2003, entitled "Portable Data Unit for Communicating With Gaming Machine Over Wireless Link," which is incorporated herein by reference in its entirety. The noted account associated with cashless gaming is, in some aspects of the present concepts, stored at an external system 46 (see FIG. 2) as more fully disclosed in U.S. Pat. No. 6,280,328 to Holch et al. entitled "Cashless Computerized Video Game System and Method," which is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 2:
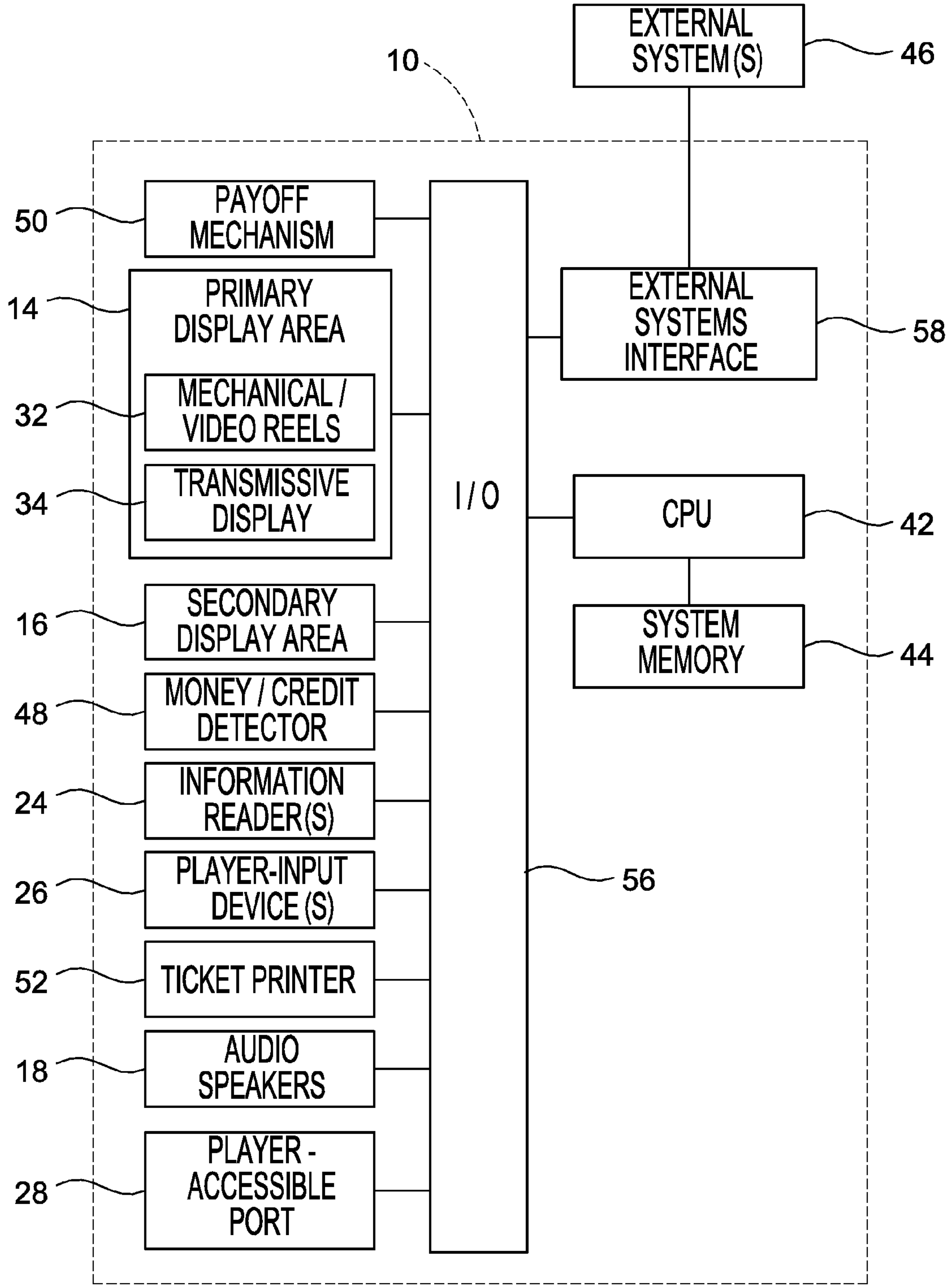
FIG. 2 (PRIOR ART)
FIG. 2 is a schematic view of a gaming system according to an embodiment of the present invention.

Turning now to FIG. 2, the various components of the gaming terminal 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, and/or firmware disposed in and/or disposed outside of the gaming terminal 10 that is configured to communicate with and/or control the transfer of data between the gaming terminal 10 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming machine 10 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal the controller 42 that money and/or credits have been input via one or more value-input devices, such as the bill validator 20, coin acceptor 22, or via other sources, such as a cashless gaming account, etc. The value-input device(s) is integrated with the housing 12 of the gaming terminal 10 and is connected to the remainder of the components of the gaming terminal 10, as appropriate, via a wired connection, such as I/O 56, or wireless connection. The money/credit detector 48 detects the input of valid funds into the gaming terminal 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 10, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device (s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external systems 46 ("thin client" gaming terminal), or are distributed therebetween in any suitable manner ("intermediate client" gaming terminal).

Figure 3:
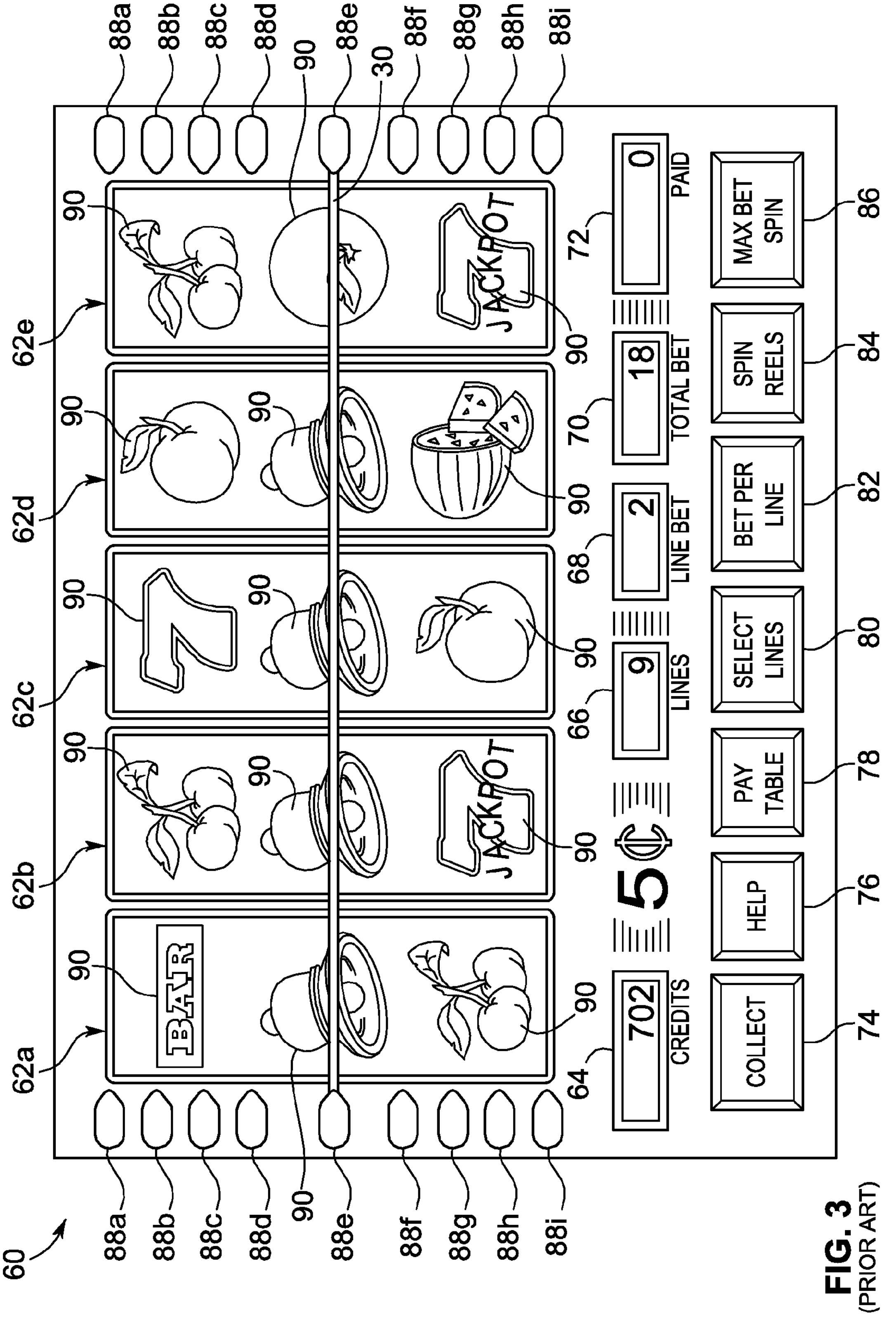
FIG. 3 (PRIOR ART)
FIG. 3 is an image of an exemplary basic-game screen of a wagering game displayed on a gaming terminal, according to an embodiment of the present invention.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

In accord with various methods of conducting a wagering game on a gaming system in accord with the present concepts, the wagering game includes a game sequence in which a player makes a wager, such as through the money/credit detector 48, touch screen 38 soft key, button panel, or the like, and a wagering game outcome is associated with the wager. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 14) through the display of information such as, but not limited to, text, graphics, text and graphics, static images, moving images, etc., or any combination thereof. In accord with the method of conducting the wagering game, the controller 42, which comprises one or more processors, transforms a physical player input, such as a player's pressing of a "Spin Reels" soft key 84 (see FIG. 3), into an electronic data signal indicative of an instruction relating to the wagering game (e.g., an electronic data signal bearing data on a wager amount).

In the aforementioned method, for each data signal, the controller 42 is configured to processes the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc.). The noted second state of the data storage device comprises storage in the storage device of data representing the electronic data signal from the controller (e.g., the wager in the present example). As another example, the controller 42 further, in accord with the execution of the instructions relating to the wagering game, causes the primary display 14 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

The basic-game screen 60 is displayed on the primary display area 14 or a portion thereof. In FIG. 3, the basic-game screen 60 portrays a plurality of simulated movable reels 62*a-e*. Alternatively or additionally, the basic-game screen 60 portrays a plurality of mechanical reels or other video or mechanical presentation consistent with the game format and theme. The basic-game screen 60 also advantageously displays one or more game-session meters and various buttons adapted to be actuated by a player.

In the illustrated embodiment of FIG. 3, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The depicted user-selectable buttons include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

As shown in the example of FIG. 3, paylines 30 extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations are evaluated in accord with various schemes such as, but not limited to, "line pays" or "scatter pays." Line pays are evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown in FIG. 3, different embodiments of the gaming terminal 10 comprise a greater or lesser number of reels in accordance with the present invention.

Figure 4:
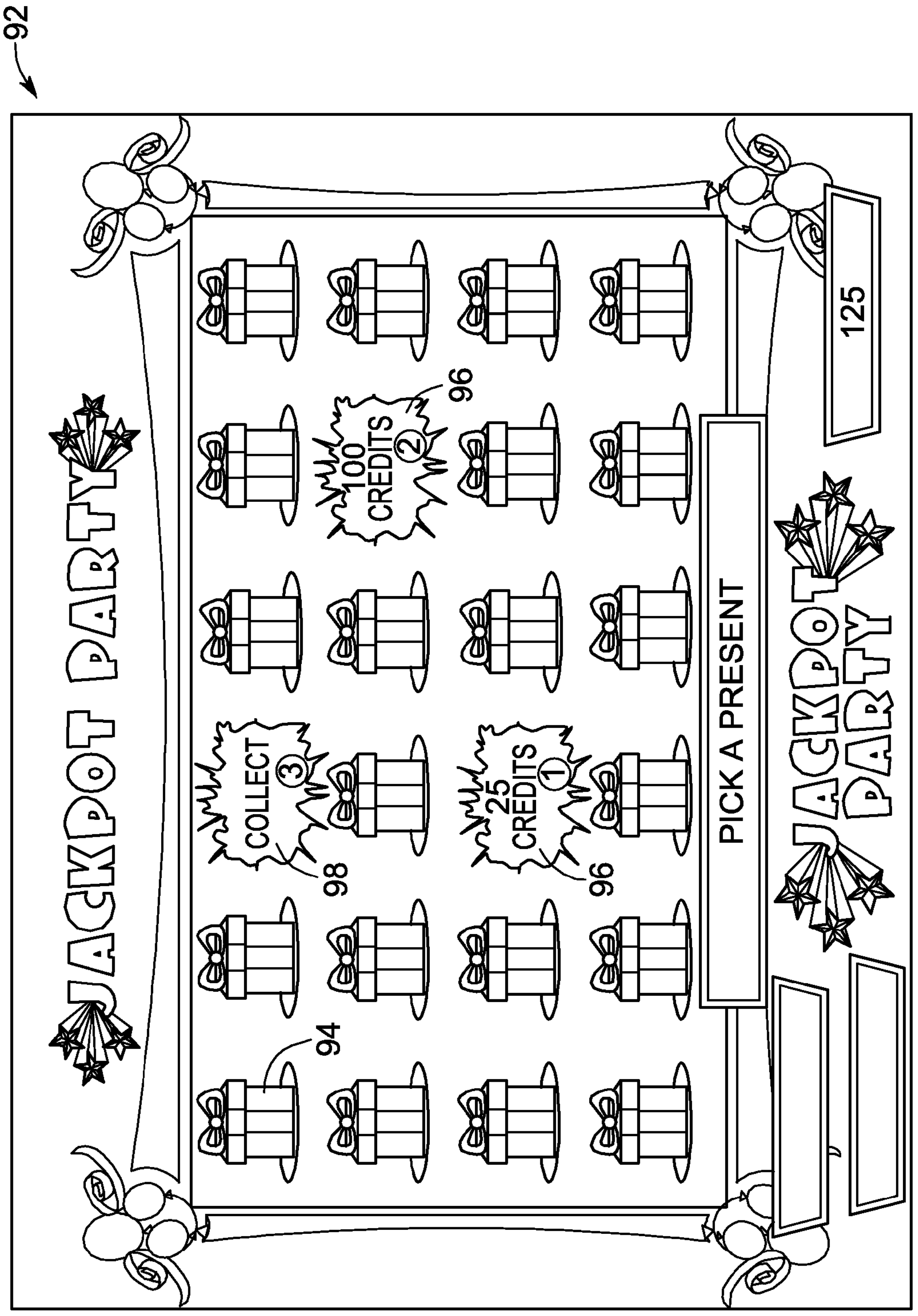
FIG. 4 (PRIOR ART)
FIG. 4 is an image of a bonus-game screen of an exemplary wagering game displayed on a gaming terminal, according to an embodiment of the present invention.

Turning now to FIG. 4, an example of a bonus game to a basic wagering game is illustrated. A bonus-game screen 92 includes an array of markers 94 located in a plurality of columns and rows. The bonus game is entered upon the occurrence of a triggering event, such as the occurrence of a start-bonus game outcome (e.g., symbol trigger, mystery trigger, time-based trigger, etc.) in or during the basic wagering game. Alternatively, any bonus game described herein is able to be deployed as a stand-alone wagering game independent of a basic wagering game.

In the illustrated bonus game of FIG. 4, a player selects, one at a time, from the array of markers 94 to reveal an associated bonus-game outcome. According to one embodiment of this bonus game, each marker 94 in the array is associated with an award outcome 96 (e.g., credits or other non-negative outcomes) or an end-game outcome 98. In the illustrated example, a player has selected an award outcome 96 with the player's first two selections (25 credits and 100 credits, respectively). When one or more end-game outcome 98 is selected (as illustrated by the player's third pick), the bonus game is terminated and the accumulated award outcomes 96 are provided to the player.

The present disclosure uses one or more community (synonymous with communal) video displays 900 (shown in FIG. 9) that display an associated community game. For convenience, this disclosure will refer to a community video display or a community display 900, but it should be understood that more than one video display can be used to display a community game, such as the community game 500 shown in FIG. 5.

The community video display 900 and associated community game controller(s) for displaying and controlling and conducting the community game, such as the community game 500 shown in FIG. 5 and described in further detail below, can be part of the external system 46 in FIG. 2. The community game controller (such as in the external system(s) 46) is coupled to the controller 42 (FIG. 2) of each of the gaming machines 10*a-c*, and the controller 42 transmits information to and receives information from the community game controller (also referred to as a community controller). In an embodiment, the community controller can receive a special-event-triggering signal associated with a special event that is achieved by at least one of the linked gaming machines 10*a-c*. The community game controller transmits a special-event-play signal to the linked gaming machines 10*a-c*. The special-event-play signal can initiate play of a community bonus game, for example.

Figure 9:
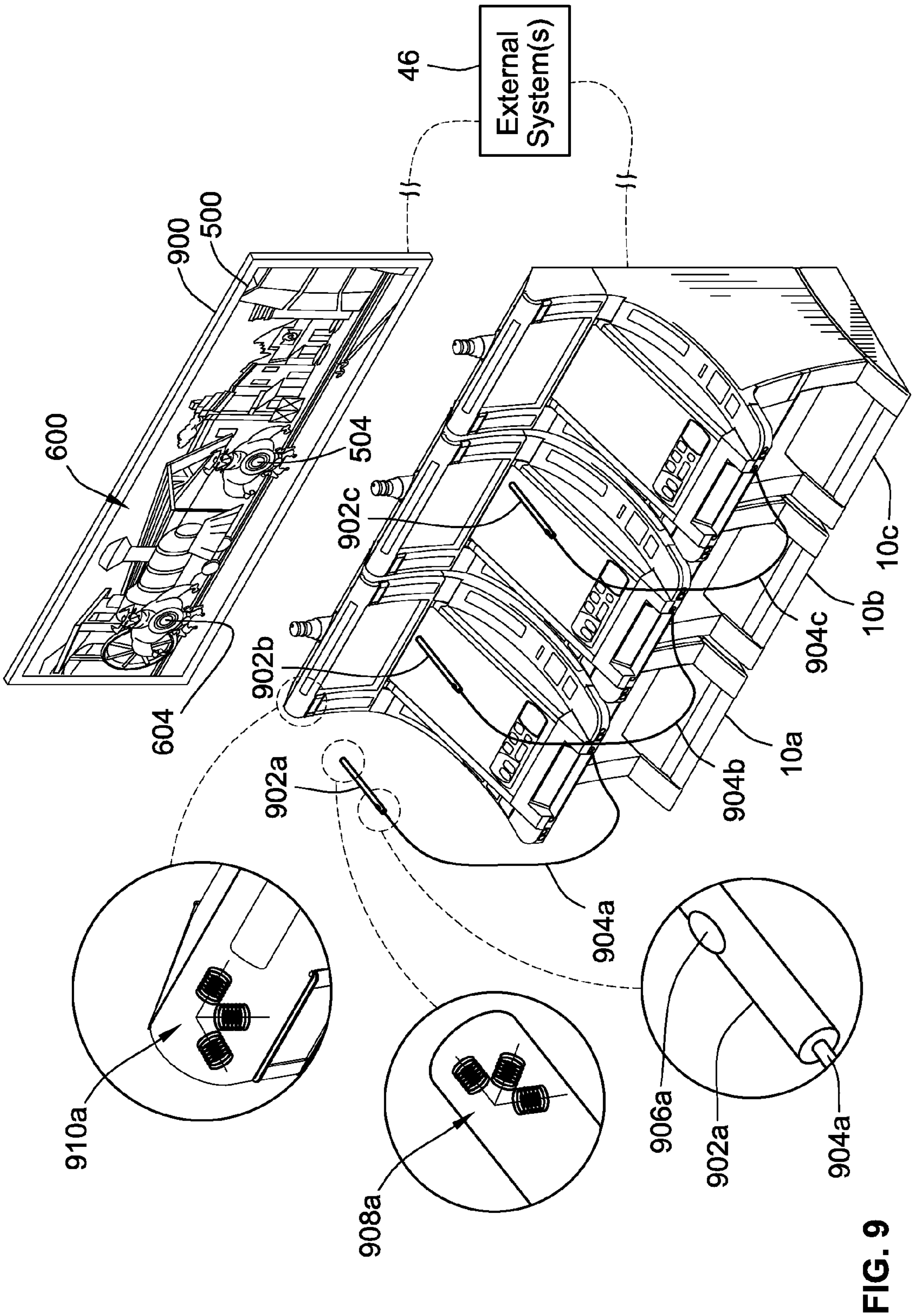
FIG. 9 is a partially isometric view and partially functional block diagram of a configuration of a community game including three gaming terminals each being connected to a wand input device, and a community display for displaying any community game disclosed herein.

The special event can be triggered by a variety of outcomes including a special outcome achieved at one of the linked gaming machines 10*a-c*, such as the gaming machines 10*a-c* shown in FIG. 9, a bonus outcome at one of the linked gaming machines 10*a-c* shown in FIG. 9, etc. The special event can also or alternately be triggered when a certain amount of time has lapsed since the last special event, at fixed intervals, when a certain sum of wager inputs have been received at the linked gaming machines 10*a-d*, when a certain number of additional or maximum wagers are received at the linked gaming machines 10*a-c*, etc. The special event can also or alternately be triggered so as to be awarded randomly as a "mystery bonus" to one or more players of the linked gaming machines 10*a-c* shown in FIG. 9. In some cases, only certain players will be eligible to play the community base or bonus game. Player eligibility to participate in the community base or bonus game can be based on random player selection or on predetermined criteria, such as the amount or number of additional or maximum wagers at the player's gaming machine, rate of wagering over time at the player's gaming machine, the time since the player last made a wager at the player's gaming machine, the time since the player last played a community game, etc. Alternatively, all players playing at the linked gaming machines 10*a-c* can be eligible.

The community game that is displayed to players playing at the linked gaming machines 10*a-c* on the community display 163 can include features for selecting objects or symbols displayed in the community game. For example, a community game can include a selection feature that allows players at the linked gaming machines 10*a-c* to select objects or symbols that are associated with awards or enhancements. In some embodiments, players at the linked gaming machines 10*a-c* can take turns selecting an object from a plurality of objects that are associated with the community game. In this manner, a player's selection of an object can be affected by prior selections made by other players because prior player selections can influence what selections are available and/or desirable to a subsequent player. This interaction, based on alternating or sequential player selections, provides for a more communal experience for the players as they root for other players to make selections that are favorable to their subsequent selections. As described below in more detail in connection with FIG. 9, the players can use a handheld input device, such as a wand-shaped object (or a wand), to select objects or symbols (individually or cooperatively selectable elements) on the community display 900.

A community game is displayed on one or more community video displays to players at linked gaming machines 10*a-c* and can include features not available to players playing on non-linked gaming machines. For example, as described herein, the community game can include a free spin feature that awards a community free spin award to all players at eligible linked gaming machines 10*a-c*. Other embodiments of a community game which are described herein award features involving cash awards (e.g., selected from different levels of cash awards), basic credit awards and variations of the basic credit awards using characters to provide enhanced awards. Any of these features can be randomly selected by the controller 42 for inclusion in a community game.

A session of a community game begins with one or more players satisfying an eligibility criterion to participate in the community game and concludes when all awards (if any) have been provided to the participating players. The aspects disclosed herein can be applied during a session of a community game or from one session to another session of a community game. In other words, while the number of participating players eligible to participate in a session of a community game is typically fixed before the session is initiated, in other aspects, players can enter or leave a session of a community game while it is being conducted on the community display and before the session concludes. To trigger a first session of a community game, a certain player or players playing their respective individual games on the mutually linked gaming terminals 10*a,b,c* satisfy an eligibility criterion to participate in the first session of the community game. To trigger a second session of the community game, a different set of players can satisfy respective eligibility criteria to participate in the second session of the community game. In other words, different players within a bank of linked (or networked) gaming terminals can participate in different sessions of a community game. The aspects disclosed herein alter the scene or selectable elements from one session to another, or alternately, within the same session (e.g., in an implementation in which players are permitted to enter and leave a community game while the session is being conducted).

Figure 5:
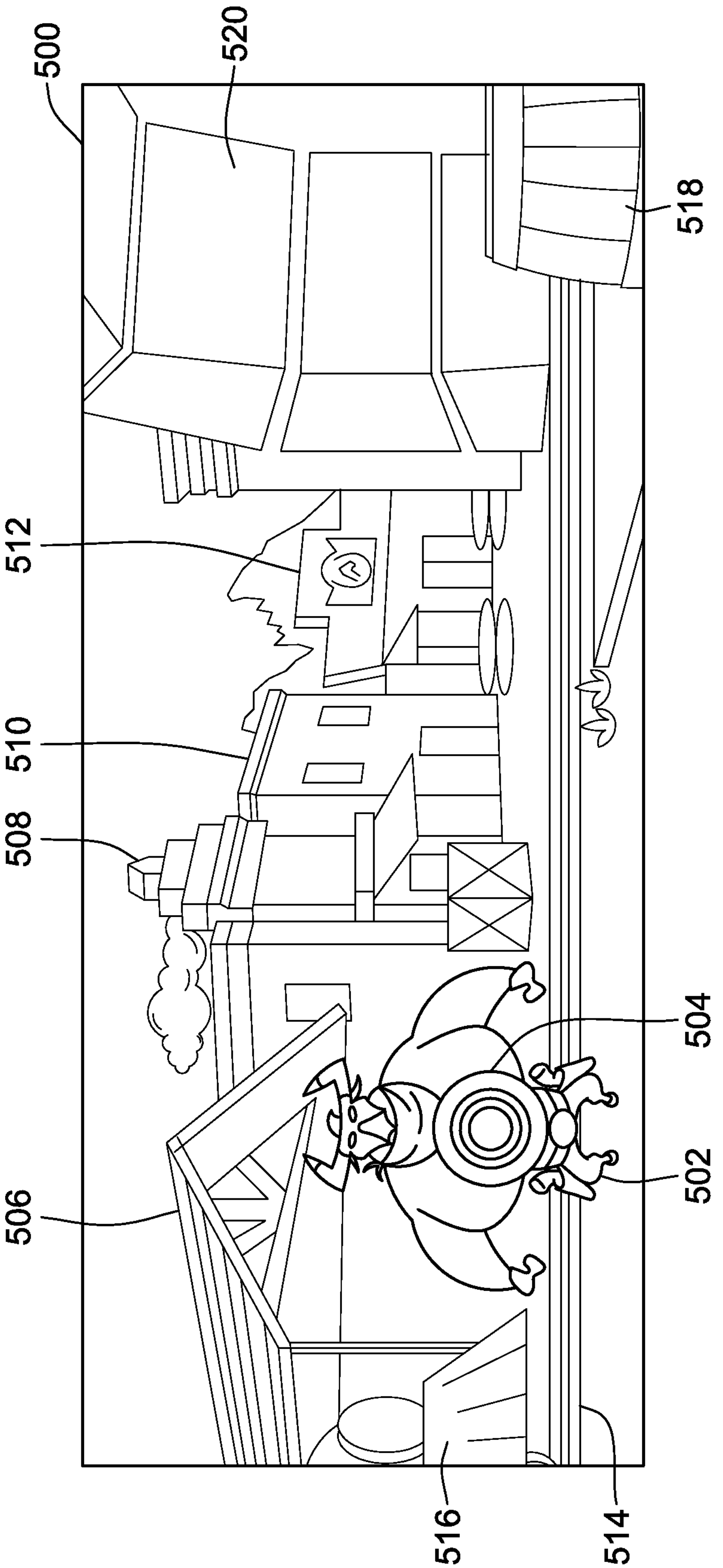
FIG. 5 is a scene of a community game showing one selectable element for selection by a first player participating in the community game.

A controller, such as a controller in the external systems 46, (hereafter called a community game controller or a community controller) receives a first indication that a first player is eligible to participate in the community game, such as the community game 500 shown in FIG. 5. The indication can be a signal from the gaming terminal 10*a* at which the first player is playing an individual base or bonus wagering game. An "individual" wagering game is differentiated from a community game and is played by an individual player. When the first player satisfies an eligibility criterion on the wagering game, such as achieving a start-special-event outcome in the wagering game, the gaming terminal is configured to send a signal indicating that the first player is eligible to participate in a first session of the community game 500. In the scene depicted in FIG. 5, only one selectable element 502 is portrayed in the scene of the first session. The scene hints to the first player at the gaming terminal 10*a* that there is more to the scene than meets the eye on the community display, for example, only part of the train 516 is displayed or an entrance to a tunnel 520 is displayed, which suggests that something further lurks within the tunnel 520. The selectable element 502 can also be referred to as a "feature." The features disclosed herein can be associated with any of several prizes, including credits, free spins, and multipliers, which are awarded when the player selects the selectable element by providing an input that corresponds to an area within a selectable area associated with the selectable element on the community display 900.

It should be noted that the use of the terms first, second, third, and so forth, is not intended to convey a temporal sequence or a particular order or rank or relative importance but rather to differentiate like items or functions from one another to avoid confusion. The articles "a" or "an" mean "at least one" or "one or more than one." Thus, the term "a controller," as used herein, can refer to one or more controllers that can be distributed across a network.

Returning to FIG. 5, a second player is playing an individual base or bonus wagering game at a second gaming terminal 10*b*, which is linked to the first and third gaming terminals 10*a*, 10*c*, and when that second player satisfies an eligibility criterion in the wagering game at the second gaming terminal 10*b*, the controller 42 associated with the second gaming terminal sends a second indication to the community game controller 46 that the second player is eligible to participate in the first or a second session of the community game 500.

The eligibility criterion by the first or second player can be satisfied by any one or more of the following: (1) playing a wagering game at a linked gaming machine 10*a-c*, (2) wagering at a predetermined level or frequency, (3) achieving a certain player status based on past plays of a wagering game or within a gaming establishment, (4) inputting a second wager amount, (5) random or arbitrary selection of the first or second player to participate in the community game, for example.

Still referring now to FIG. 5, an example depiction of a scene from the community game 500 is shown as displayed on the community display 900. The community game 500 has a theme, such as an Old Western town theme, and includes a first selectable element 502 that is displayed as an image of a "cowbull" (a bull character dressed as a cowboy) bearing a target 504 (e.g., portrayed as a bullseye target) representative of a selectable element or target on the community display 900. In this scene, only one selectable element 502 is shown with a target 504 delineating a selectable area that can be selected by a player. The selectable area is correlated by the community controller with the target 504 graphic displayed on the community display 900. In this example scene, only one player (such as the first player at the gaming terminal 10*a*) is participating in the first session of the community game 500. The scene depicts images related to the theme, in this case buildings 506, 508, 510, 512 à la Old Western style as well as train tracks 514. The scene also depicts images representing objects that are only partially visible on the community video display(s). On the left side, a train 516 is partially visible, and part of a barrel 518 is visible on the right side of the scene.

The community display 900 displays at least a portion of the community game. The community game 500 can have a number of scenes or environments that are only partially depicted on the community display 900, but as more players join in to participate in the community game 500, more of the scene or environment becomes visible to the participating players on the community display, as described in more detail below. When the maximum number of players are participating in a session of the community game, the entire scene or environment can be portrayed on the community display. The scene or environment is thematically consistent with the theme of the wagering game.

The community controller 46 can receive a second indication that a second player is eligible to participate in the first session of the community game or a second indication that a set of players different from the first session are eligible to participate in a second session of the community game. In these examples described in connection with FIGS. 5-6, it will be assumed that only one player is participating in a first session of the community game (at least until a second player optionally joins the first session), and that two or more players are eligible to participate in a second session of the community game, unless otherwise indicated. The second player, in this example, is playing an individual wagering game at the gaming terminal 10*b* and has satisfied an eligibility criterion in the individual wagering game that allows the second player to participate in the first or second session of the community game 500. When the community controller 46 receives the second indication, the field of view or a virtual camera angle of the scene portrayed on the community display 900 is changed during the first session or in the second session. A field of view refers to the extent of an observable environment or virtual world that is visible to the player(s) at a given moment. Alternately or in addition, a virtual camera angle can be changed as more players achieve eligibility to participate in the community game. The virtual camera angle is taken from the perspective of the player, as if the player was holding a camera and panning the camera or zooming with the camera lens into or out of the scene.

Figure 6:
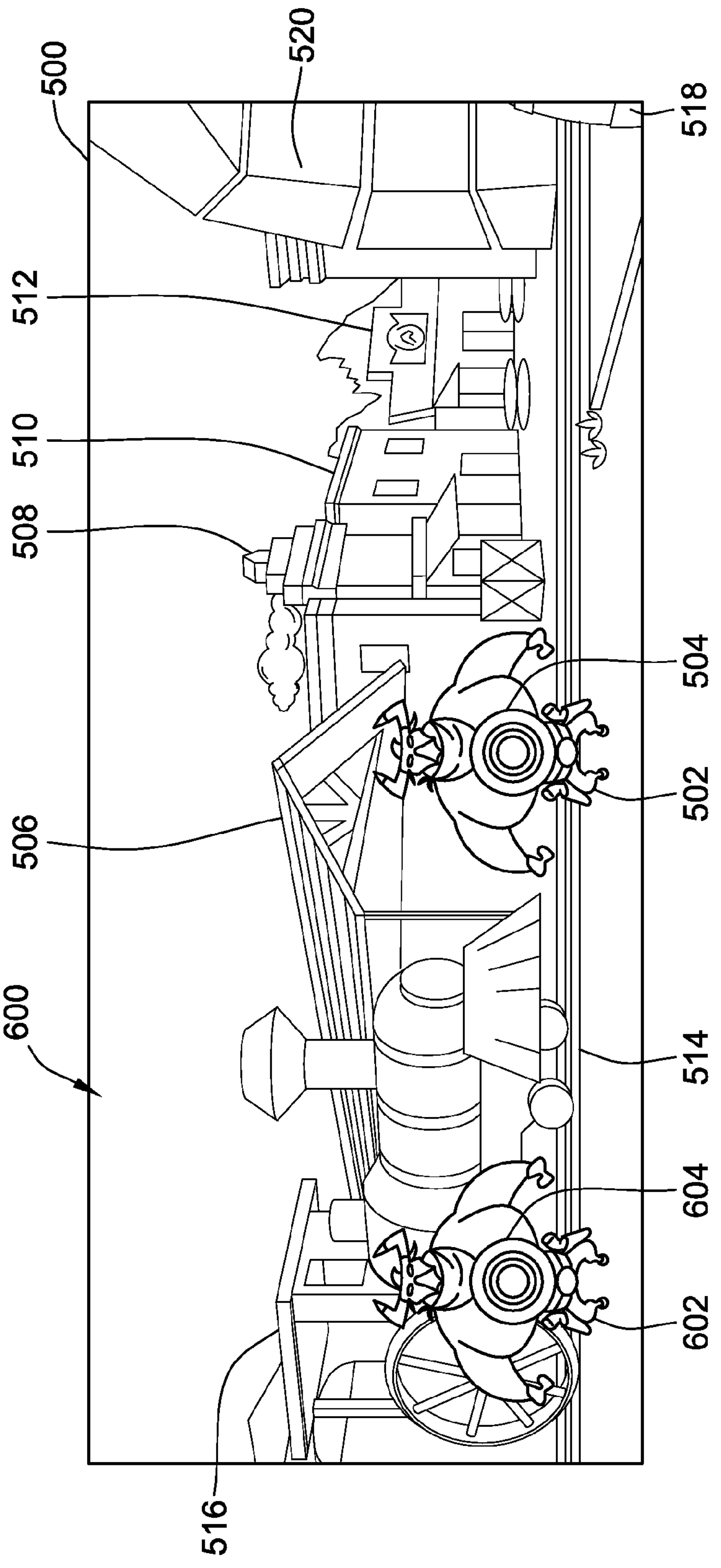
FIG. 6 is the same scene shown in FIG. 5 in which the field of view has been expanded and a virtual camera angle has been panned to the left to reveal an additional selectable element for selection by a second player who has recently gained eligibility to participate in the community game.

A comparison of the scenes shown in FIG. 5 and FIG. 6 reveals that once the second player has joined the first session of the community game or is part of a group of participating players in the second session (where the second session has two or more participating players), the field of view expands to reveal more of the scene 600 and the virtual camera angle pans slightly to the left because less of the barrel 518 is now visible in the scene 600 depicted in FIG. 6. The train 516 is now fully visible in the scene 600 as a result of panning the virtual camera angle to the left (from the perspective of the second player) and expanding the field of view to reveal more of the Old Western-themed environment or background.

Importantly, what is also revealed now is a second selectable element graphically portrayed as a second "cowbull" 602 bearing a corresponding bullseye target 604 on his chest. The target 604 is associated with a corresponding selectable area such that if an input selection is received from either the first or the second player in the selectable area, the second selectable element is indicated to have been selected. The second cowbull 602 was not previously selectable in the scene depicted in FIG. 5 when only the first player at the gaming terminal 10*a* was participating in the community game 500. Alternately or additionally, the second cowbull 602 was not previously displayed in the scene depicted in FIG. 5. Thus, as more players participate in the community game 500 in the same session or from one session to another, the more selectable elements become either selectable or displayed or both when previously they were not selectable or displayed on the community display 900. Put differently, the second selectable element 604 in FIG. 6 was hidden or obscured from view on the community display 900 in the scene depicted in FIG. 5 in the first session but is revealed when the second indication is received from the second player at the second gaming terminal 10*b* to join in the first session or to participate in the second session. In response to receiving the second indication, the community controller changes the field of view and/or the virtual camera angle to cause the second selectable element to appear in the field of view (that is visible to at least the second player on the community display 900). Instead of being obscured, the additional selectable elements can be displayed in the scene in phantom so that the players can see them, or at least an outline or a suggestion of what they are, but cannot select them until additional players join in the first session of the community game 500 or until a subsequent session in which more players are participating in the community game 500.

As mentioned above, to change the field of view or the virtual camera angle from the scene depicted in FIG. 5 to the scene depicted in FIG. 6 on the community display 900, the view of the scene can be changed in any given session or from one session to another by zooming out or panning the scene to expand or shift the field of view such that the second selectable element 604 is brought into the field of view of at least the second player at the gaming terminal 10*b* on the community display 900. Preferably, but not exclusively, when zooming out or panning the scene, selectable area corresponding to the first selectable element 504 (and the corresponding cowbull symbol or object 502) does not diminish in size, but is rather scaled in size so that the first selectable element 504 now appears to have the same size and scale as in FIG. 5. Normally, a zooming or panning can cause an object to diminish in size and scale, making it more difficult for a player to select that object. To avoid this potential source of frustration for the participating players, the size and scale of the selectable elements remains the same even as the field of view or virtual camera angle is changed as more players achieve eligibility to participate in the community game 500 either during the first session or in the second session.

Optionally but not necessarily, the number of selectable elements displayed on the community display 900 is proportional to the number of players participating in the community game 500 in any given session thereof. Each selectable element 504, 604 can be associated with respective awards that can be of the same type or a different type. For example, in FIG. 5, when one player is participating in the first session of the community game 500, the selectable element 504 can be associated with a first award having a first type. If the first player at the gaming terminal 10*a* selects the selectable element 504, the first player is awarded the first award of the first type. But in FIG. 6 (representing a second session, for example, with two participating players), the second selectable element 604 can be associated with a second award having a second type, where the second type is more valuable than the first type of award. This encourages would-be participants in the community game 500 to participate because the awards become more valuable if they join. Alternately, the second type can be different from the first type, or both the first type and the second type can be the same.

Although FIGS. 5 and 6 show that the first selectable element 504 remains in the scene when more players participate in the community game 500 in the first session or from one session to another, in other implementations, the first selectable element 504 can be removed from the scene and replaced with one or more selectable elements, including the second selectable element 604. It should also be noted that when the field of view or the virtual camera angle is changed, the newly visible parts of the scene are logically and thematically related to the theme and to the originally displayed scene. In the implementations where new players are permitted to join in a community game as a session is being conducted, an animation can be displayed as the scene is changing, e.g., as the field of view expands and as the virtual camera angle pans to the left from FIG. 5 to FIG. 6, a sequence of images can be displayed to reveal the expanded, shifted view of the scene, as if being filmed and played back by a video recording device.

As fewer players participate in the community game 500 either during the first session or from one session to another, the scene can be reversed to reduce the number of selectable elements and the field of view and/or the virtual camera angle. For example, when two players are participating in the scene 600 shown in FIG. 6, if the second player loses eligibility to continue participation in the community game 500 or otherwise stops participating in a subsequent session of the community game 500, the scene can revert to the scene shown in FIG. 5.

The aspects discussed above relate to changing from one session to another or within a session a field of view or a virtual camera angle as a function of the number of players participating in the community game. Further aspects of the present disclosure will be described next, centered around a cooperative target that produces an enhanced award when more than one player selects it. A cooperative target is referred to herein as a cooperatively selectable element, which means that the object associated with a selectable area is selectable by more than one player. It can also be selected by individual players, but can be associated with a more valuable or enhanced award if selected by more than one player.

Figure 7:
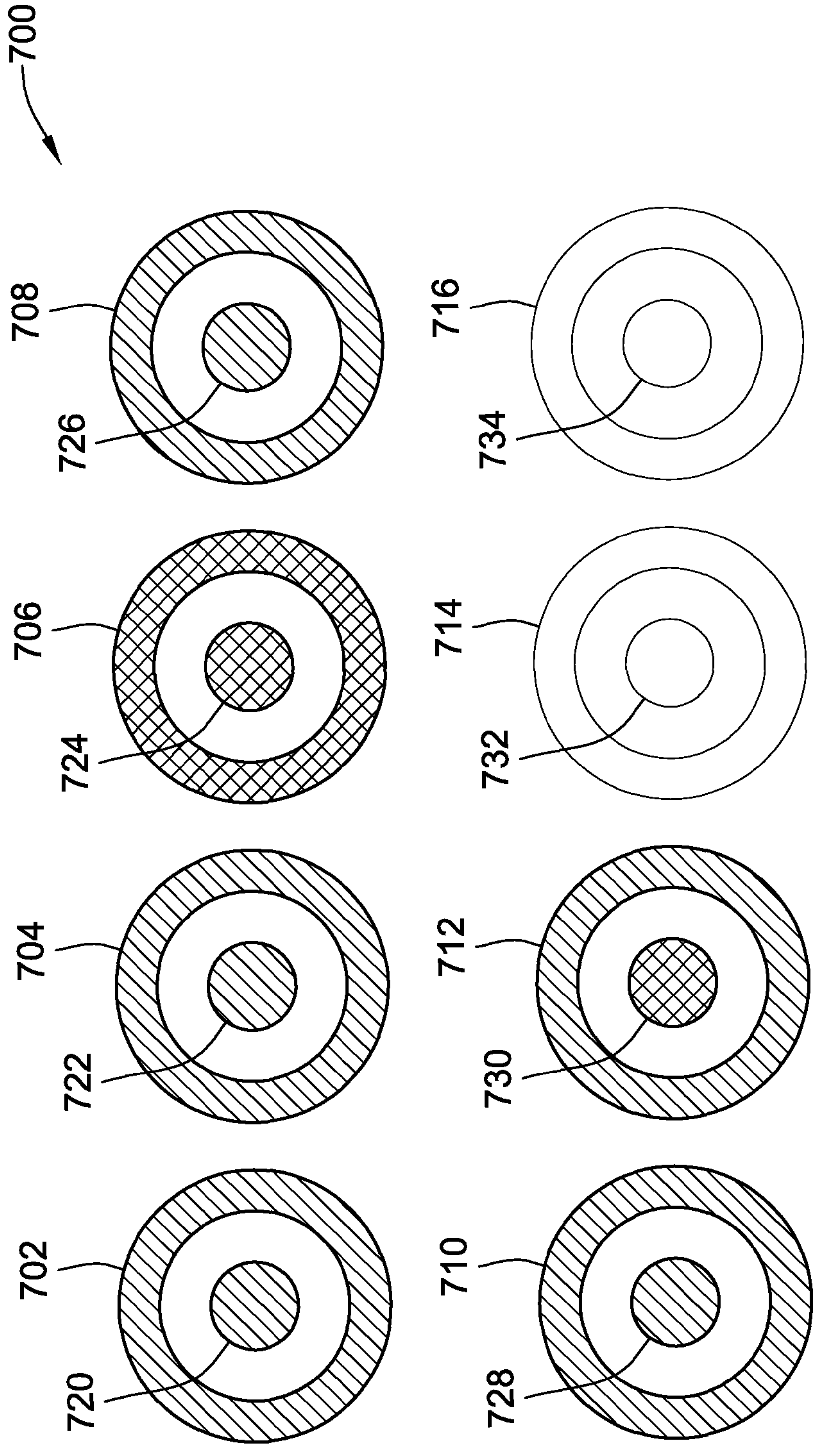
FIG. 7 are example cooperatively selectable targets that can be selected by more than one player participating in the community game.

FIG. 7 illustrates an arrangement of eight cooperative targets or cooperatively selectable elements 702-716 that are represented as bullseye targets, but of course they can be portrayed as any other object that is thematically related to the theme of the community game 500. Each of the cooperatively selectable elements 702-716 has a corresponding bull's eye 720-734. In this example, two players at gaming terminals 10*a*, 10*b* are participating in a session of a community game displayed on the community display 900 and are attempting to hit or select as many targets as possible, including targets that the other player has already selected. In this example, the first player at the gaming terminal 10*a* has selected the cooperatively selectable elements 702, 704, 708, and 710. The second player at the gaming terminal 10*b* has selected the cooperatively selectable element 706. Optionally, the cooperatively selectable elements 702, 704, 708, and 710 selected by the first player can be displayed in a particular color whereas the cooperatively selectable element 706 can be displayed in a different color. In general, the cooperatively selectable elements, once selected, are modified in a way that is visually discernible which player has selected which cooperatively selectable element. Use of different colors is but one of many examples, and FIGS. 8A-8C illustrate another example.

Figure 8A:
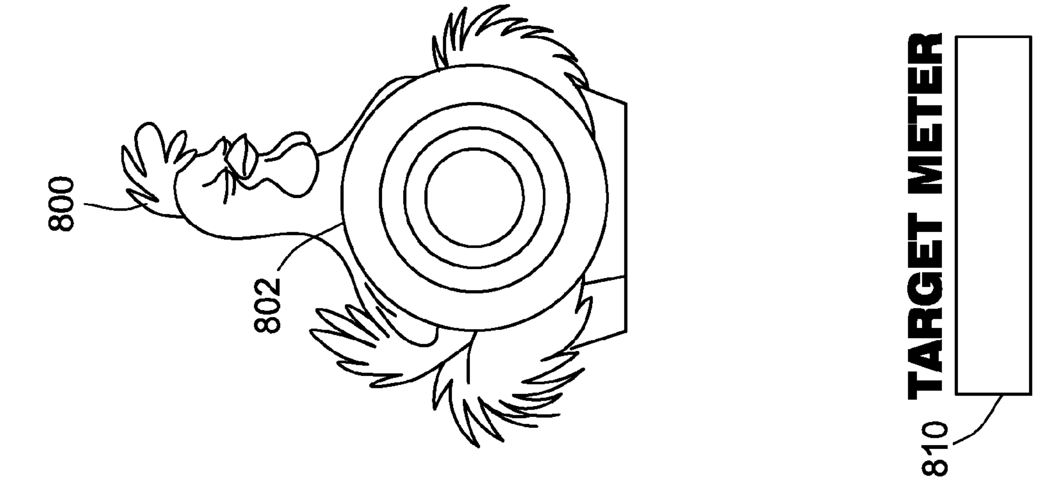
FIGS. 8A-8C are example illustrations of a sequence of images of a cooperatively selectable target that reveals an additional target when a new player participates in the community game, along with a target meter that tracks associated awards.
Figure 8B:
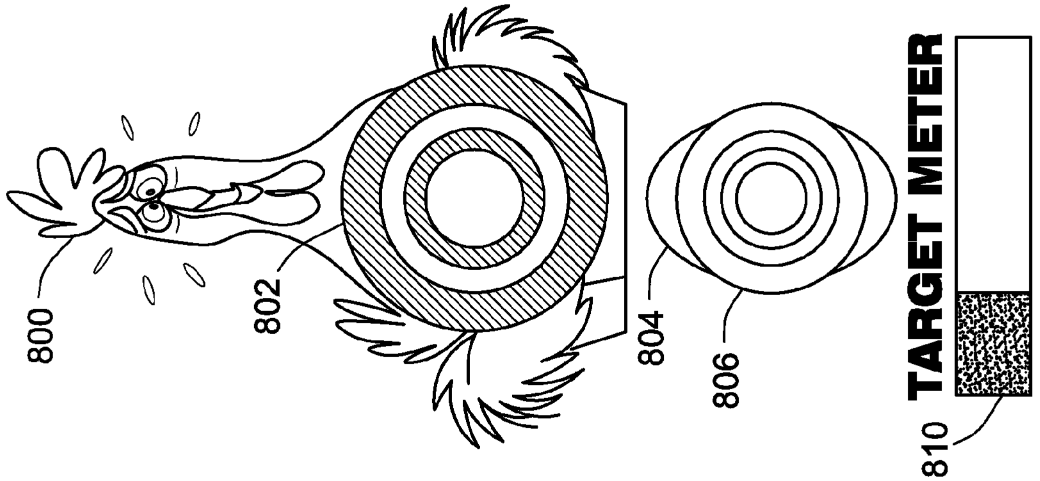
Figure 8C:
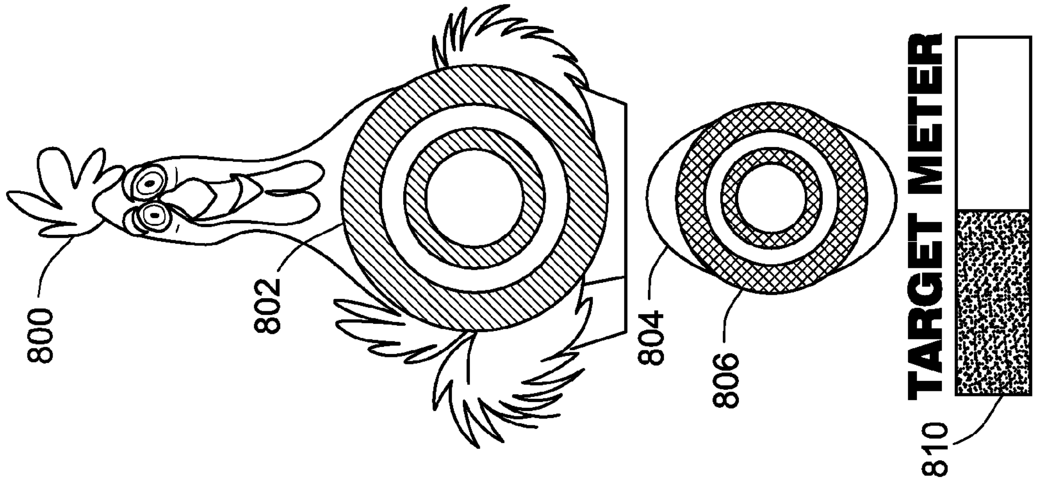

In FIGS. 8A-8C, instead of changing colors, another selectable element becomes available as more players participate in the community game from one session to another or within a particular session. In FIG. 8A, the cooperatively selectable element 802 is depicted as a bullseye target on a chicken object 800, which is thematically related to the theme of the wagering game, which, for example, can be related to chickens or a bakery that uses eggs laid by the chickens to bake a cake. A target meter 810 shows graphically or numerically the player's accumulated awards as they hit targets on the community display 900.

In FIG. 8B, a first player at the gaming terminal 10*a* has selected the cooperatively selectable element 802 in a session of the community game by providing an input in a selectable area corresponding to a bullseye target depicted on the chicken object 800. The bullseye target 802, in this example, changes to a color that indicates that the first player (as opposed to another player participating in the community game) selected the cooperatively selectable element 800. The target meter 810 fills up to a level commensurate with the award associated with the selection of the cooperatively selectable element 802. When the first player selects the cooperatively selectable element 802 in FIG. 8B, the chicken object 800 lays an egg 804, which has a corresponding cooperatively selectable element 806 for any other player already participating in the community game to select. Now the cooperatively selectable element 806 is available for selection, which would not be available if only one player were participating in the community game. In this example, the expression on the chicken's face turns to one of surprise or relief at laying the egg. If when the first player selects the cooperatively selectable element 802 in FIG. 8B, no other players are participating in the community game, the first player can be awarded a personal or individual award that has a diminished value relative to the award the first player would have been awarded had the selection been made when other players were participating in the community game.

In FIG. 8C, in the same session of the community game, a second player at the gaming terminal 10*b* has selected the cooperatively selectable element 806, whose color is changed to indicate that the second player has selected the cooperatively selectable element 806, and the target meter 810 is updated to reflect that the cooperatively selectable elements 802 and 806 have been selected. The expression of the chicken changes to consternation or concern about the loss of her egg. A cooperative award associated with the selection by the second player of the cooperatively selectable element 806 can be greater than an individual or personal award associated with the selection by a solo player of the cooperatively selectable element 802 in FIG. 8A before the second player joined in the community game. Both players can share the cooperative award either equally or unequally, such as for example based on which of the two players has played the cooperative game longer or has achieved a VIP or other enhanced status relative to other patrons in the gaming establishment. Alternately, the cooperative award can be awarded to the player who selected it in the community game. Still alternately, the cooperative award can be shared among all of the players participating in the community game, not just the players who selected the elements 802 and 806. For example, there may be two other players participating in the community game, and all four players share the cooperative award in this example.

It should be emphasized that the threshold minimum to activate the cooperatively selectable elements has been one in these examples, but in other implementations, a different minimum number of players can be required to be participating in the community game to activate the cooperative selectable elements, or, as more players join, the number of or potential award value associated with the cooperatively selectable elements increases. These thresholds can change from session to session as a function of the number of players participating in a given session of the community game.

Referring to FIG. 8A, if only one player is participating in a session of the community game when the first player selects the target 802 in FIG. 8B, the target 802 remains a merely selectable element selectable only by the first player at the gaming terminal 10*a*. However, when a second player either joins in the community game or together with the first player becomes eligible to participate in another session of the community game, the community controller reconfigures the selectable element 802 shown in FIG. 8A to be a cooperatively selectable element 802 shown in FIG. 8B such that it can now be selected by more than one player.

Any or all of the aspects discussed in connection with FIGS. 7 and 8A-8C can be combined with any or all of the aspects discussed in connection with FIGS. 5-6. For example, when only one player is participating in a session of the community game, additional cooperatively selectable elements can be hidden or obscured from the scene displayed on the community display 900. When a second player joins that session or more than one player becomes eligible to participate in another session of the community game, the field of view or the virtual camera angle is changed to bring into view or focus on the community display 900 the hidden or obscured cooperatively selectable elements such that they are now available for selection. Each selectable element has an associated selectable area delineated by a contour or outline of the graphic associated with the selectable element. The selectable area of the selectable element coincides with a corresponding selectable area of the cooperatively selectable element in the scene. In other words, both players can aim for the same target, such as the target 806 shown in FIG. 8C. As shown in FIG. 8B, the chicken graphic is altered to indicate to the second player that the cooperatively selectable element 806 is available for selection by the second player.

Above, we have described altering a field of view or a virtual camera angle as a function of the number of players participating in a community game (FIGS. 5-6) in a given session or from one session to another, providing cooperatively selectable targets as a function of the number of players participating in the community game in a given session or from one session to another. In the aspects described below in connection with FIG. 9, the appearance of a community game is adapted based on the number of participating players and the location of the gaming terminals at which each participating player is playing.

Like the aspects disclosed in connection with FIGS. 5 and 6, a community controller, such as in the external system(s) 46, receives a first indication that a first player is eligible to participate in a first session of a community game, such as the community game 500, which has a theme (e.g., an Old Western theme) and configured to be played by multiple participating players, such a first, second, and a third player stationed at the first, second, and third gaming terminals 10*a,b,c*, respectively. The community display 900 displays in the first session at least a portion of the community game that includes a scene portraying images, such as the images 506, 508, 510, 512, 514 related to the theme. Each of the gaming terminals 10*a,b,c* is linked together by a communication link or network. The community controller establishes a communication link with each of the gaming terminals 10*a,b,c*. The community controller receives first location information indicative of a location of a first of the gaming terminals 10*a* at which the first player is participating in the community game. Although in FIG. 9, the gaming terminals 10*a,b,c* are shown side-by-side, in other implementations, a number, such as two, four, six, or eight, of the gaming terminals can be arranged in different configurations, such as in a circular or semi-circular configuration.

The community controller receives a second indication that a second player at the second gaming terminal 10*b* is also eligible to participate in the first session of the community game 500, and second location information indicative of a location of the second gaming terminal 10*b* at which the second player is participating in the community game 500. Thus, the community controller has information about the respective locations of the participating gaming terminals 10*a*,10*b*, which will be used as described below. The locations are used to shift the focus of the view at the areas of the community display that are closest to the newly participating player's gaming terminal.

For example, referring to FIG. 9, if a first player is participating alone in a session of the community game 500 at the middle gaming terminal 10*b*, the first player's selectable element 504 is displayed proximate to the first player's gaming terminal 10*b*. By proximate, it is meant that the displayed target can be selected by the first player along a line of sight that does not interfere with selections made by adjacent players participating in the community game. In this example, proximate means that the target 504 is displayed above the gaming terminal 10*b* such that it is within the shortest possible range for the first player to make the selection as opposed to other players trying to make the same selection.

Now, when a second player at a second gaming terminal 10*a* becomes eligible with the first player to participate in a session of the community game 500, the second selectable element 604 is displayed on the community display 900 based on the location of the second gaming terminal 10*a* and proximate to the second gaming terminal 10*a*. This means that the distance between the selectable element 504 and the first player is shorter than any other selectable elements displayed on the community display 900, and that the distance between the selectable element 604 and the second player is shorter than any other selectable elements displayed on the community display 900.

Alternately or additionally, when at least two players become eligible to participate in a session of the community game, the field of view or a virtual camera angle of the scene is altered as described in connection with FIGS. 5-6 to cause a previously obscured or hidden part of the scene to be displayed proximate to the gaming terminal at which the second player is participating in the community game. Now, for example, the train 514 that was previously obscured in the scene when only one player was participating solo in a different session of the community game is now visible in the field of view of the second player on the community display 900 in the current session.

Alternately, the type of scene depicted on the community display 900 can be a function of how many gaming terminals are participating in a given session of the community game. For example, if only three gaming terminals are participating in a first session, a first scene can be displayed on the community display 900 in the first session. But if five gaming terminals are participating in a second session, a second scene can be displayed on the community display 900 in the second session, where the second scene, for example, can have a richer or more dense visual impact compared to the first scene with more available targets and/or a variety of targets compared to the first scene. The first and second scenes can be related to the same theme or a different theme.

By way of another example, if only one player is participating solo in a first session of the community game 500 and that player is using the gaming terminal 10*b* in the center of the bank of gaming terminals, the community display 900 can be altered so that the selectable elements in the community game are shifted toward the center of the community display 900 so that they are easier to select by the sole player at the gaming machine 10*b* in the first session. When new players become eligible to participate in a second session of the community game, new selectable elements can be displayed proximate the gaming terminals of the newly participating players. In this way, the placement of the selectable elements is adapted based on the location of the gaming terminals of the participating players. The number of selectable elements as well can be increased commensurate with the number of participating players from one session to another or within a given session. For example, when one player is participating in a first session of the community game, four selectable elements can be displayed on the community display 900. But when three players are participating in a second session of the community game, twelve selectable elements can be displayed on the community display 900.

Although the particular input means used by the players to make their selections of selectable elements on the community display 900 is not a particular focus of the present disclosure, a specific but exemplary input system will be described next in connection with FIG. 9. One handheld object, such as a wand 902*a,b,c* is connected by respective wires 904*a,b,c* to the corresponding gaming terminals 10*a,b,c*. Each wand 902*a,b,c* has one or more buttons 906*a* or switches (only one button is shown on the wand 902*a* for clarity of illustration, but it should be understood that the other wands 902*b,c* share the same features as the wand 902*a*). The wand 902*a* includes three mutually orthogonal (e.g., oriented in the x, y, and z directions) sensing coils 908*a* that are configured to sense an electromagnetic field generated by a corresponding set of three mutually orthogonal transmitting coils 910*a* disposed in the gaming terminals 10*a,b,c* or in the community display 900 or at a location or locations within a sensing range of the wands 902*a,b,c*. In this example, the transmitting coils 910*a* are disposed in each of the gaming terminals 10*a,b,c*. The transmitting coils 910*a* are configured to generate an electromagnetic field that is transmitted along each of the mutually orthogonal coils 910*a* at 90 degrees relative to each other. The sensing coils 908*a* sense the electromagnetic energy, and based on the strength of the detected field, the relative orientation and position of the wand in three-dimensional space can be determined by a controller, such as a controller in the external systems 46. When a player holding the wand 902*a* desires to make a selection of a selectable element on the community display 900, the player points the wand in the three-dimensional space in front of the gaming terminal 10*a* and stops at the target the player wishes to select. Optionally, a cursor or other indicium can be displayed on the community display 900 to track the location of the wand 902*a* as the player waves it in front of the community display 900. To select the selectable element, the player depresses the switch or button 906*a*, which sends the selection information, along with the coordinate information representing the location and orientation of the wand 902*a* at the time that the button or switch 906*a* is depressed, to the external systems 46 for determining an action to be performed as a result of the selection, such as awarding the player making the selection an award.

An award awarded to any particular participating player is based on the number of targets collected by that participating player, and can be bonus free spin events, more free spins, a mystery prize, a number of credits, a bonus event, and the like, which can be redeemed on the individual wagering game being played by the participating player on the gaming terminal 10*a,b,c*. The award types can be adapted to the skill of the participating player to discourage unskilled players from becoming frustrated and ceasing their participation in the community game. For example, if an unskilled participating player in a particular session of the community game is missing many of the targets, the community display 900 can be adapted to display in front of the unskilled player an easy target that has a large selectable area. If this unskilled player is using the center gaming terminal 10*b*, the large target can be positioned in the center of the community display 900 to make it easier for the unskilled player to hit the target.

Instead of using electromagnetic radiation, infrared transmitters and receivers can be used to locate and orient the handheld devices in three-dimensional coordinate space. Likewise, instead of transmitters and receivers, a virtual track pad on a touch screen on each of the gaming terminals 10*a,b,c* can be sued by the player to move a cursor on the community display 900 and thereby make selections by touching the touch screen. Alternately, a track ball can be used by the players at the gaming terminal to move a cursor around on the community display 900 and to make selections by a button adjacent to the track ball.

Referring once again to FIG. 9, the community display 900 can be utilized to depict a skill-based community game thereon. The skill-based community game includes at least one skill component that provides an actual or apparent advantage to a player as their proficiency at the skill-based community game increases. As discussed above, the skill-based community game can be a community game in which a plurality of selectable targets 504, 604 are presented for selection by a player of the skill-based community game. In one embodiment, the skill-based community game takes the form of a shooting game where the player may be required to display a particular level of proficiency at aiming so as to select their desired target 504, 604. For example, the player may be required to point their respective wands 902*a-c* in the direction of the particular target 504 and depress the respective switch 906*a* to "shoot" at the intended target. Players that have properly "aimed" their wand 902 at the target 504 at the time the "trigger" (e.g., switch 906) is depressed are awarded the selection, whereas players that have incorrectly aimed their wand 902 may not be awarded the particular selection.

In the above-described skill-based community game, players may be given multiple chances to hit one or more targets 504, 604. Although players have multiple opportunities to hit targets, some players may be less proficient at doing so than others. However, in a skill-based wagering game, the operator may want to limit the amount of expected-value variation among players. In other words, the operator may want to ensure that a highly skilled player receives the same overall payout as a player with no skill at all. In one embodiment of the present invention, the skill-based wagering game is designed to alter the mathematical outcomes such that players of high skill and of low skill have substantially identical expected values for the skill-based wagering game.

In one embodiment, the skill-based wagering game utilizes a physics-based world within game. When players miss targets within the physics-based world, the bullets may bounce off other objects in the environment. These bounces and ricochets can be used to balance out the mathematics of the game by tracking the number of targets hit and missed as the bonus progresses and by manipulating the physics accordingly. For example, if a player has been consistently missing targets, the game can begin to force "lucky bounces" where a bullet ricochets off an object in the environment and hits the intended target, a different target, or a mystery area. By "handicapping" the skill-based wagering game in this manner, the player feels they got lucky instead of getting a "pity" award at the end of the bonus. The worse a player is, based on the tracking of targets missed, the luckier the player appears to be as their misses begin to strike targets within the physics-based world.

In another embodiment, the physics-based world may include random "multi-selection" targets and "self-destructing" targets. These targets, when hit, or ricocheted into, by a less skilled player may explode to award multiple targets in proximity to the original target, or they may even simply randomly self-destruct without being hit by a player. In a skill-based community game, for example, as the players progress through the skill-based bonus rounds, some "player-specific" targets may be provided on the community display 900. These player-specific targets may only be selected by (e.g., shot), and awarded to, a particular player. The award values of these player-specific targets may appear to be random to the players, but are, in fact, adjusted based on the players' proficiency up through that point of the skill-based community game. Thus, the less proficient a particular player has been up to that point of the skill-based community game, the more likely that player is to receive a higher value for their associated player-specific target. Alternatively, the less proficient players can be given various advantages over the remainder of the skill-based wagering game, such as a higher quantity of targets, larger targets, exploding bullets, a different type of weapon with a larger blast radius (e.g., pistol, to sniper, to shotgun, to rocket launcher as continued lack of skill is demonstrated).

In certain embodiments, the skill-based wagering game may be separated into two unique components, an interactive skill-based component and a non-skill-based component (e.g., a free-spin component). The skill-based component may have a small effect or no effect on a player's payback percentage, whereas the non-skill-based component creates the true mathematical variety, volatility, and near-miss experience that are desirable for a wagering game. For example, the skill-based component may be a shooting game as described above, including a plurality of shootable targets. For each target a player shoots, the player is awarded a free spin in a subsequent, non-skill-based component. Thus, the more skillful a player, the more free spins they are awarded in the subsequent event.

The non-skill-based component, however, may be adjusted to compensate players displaying lesser proficiency at the skill-based component. In one embodiment, if a player misses every target in the skill-based game (or decides not to participate at all in the skill-based component), they may be provided two free spins. Alternatively, a player that went ten for ten in the skill-based component may be provided twelve free spins. So as to ensure that the non-skillful player has the same payback percentage as the skilled player, the mathematical model for the two free spins is altered to be different from the mathematical model of the twelve free spins. For example, if the average payout for each of the twelve free spins is 1×, the average payout for each of the two free spins could be adjusted to be 6×. Thus, the overall average payout for both the skilled and unskilled player is 12×, but the volatility and game experience for each player is dramatically different.

In one embodiment of the skill-based community game, a non-skill-based individual event may be provided subsequent to the skill-based community game. The non-skill-based individual event may be a compensatory bonus event or a converted bonus event. A compensatory bonus event may be utilized to award a player of lesser skill the difference in expected value between their skill level and the skill level of a highly skilled player. For example, if all players are given ten bullets for a skill-based community game, a player that goes ten for ten receives the entirety of their bonus award from the skill-based community game. The lesser-skilled player, who, for example, goes six of ten, may be provided a compensatory individual bonus where they are given four selections in an individual picking game that occurs on their respective gaming terminal 10.

A converted bonus may be given to a player that goes zero for ten (or doesn't participate at all), where the converted bonus again is an individual bonus that occurs on that respective player's gaming terminal 10, but which provides the same or different game play than the compensatory bonus. For example, the less skilled player may have enjoyed the interactivity of the skill-based community game, so awarding them an interactive picking game allows them to continue to participate and feel in control of their awards. Alternatively, a non-participating player may have chosen not to play because they didn't want to feel in control of their outcomes or feel "unlucky" and, as such, may be given a non-interactive converted bonus, such as a free-spin bonus event. By using an individual compensatory or converted bonus after the skill-based community game, an operator can allow skilled players to return to their basic game play quickly, and not feel "held up" by the slower or less proficient players. Further, by awarding individual compensatory or converted bonuses, as opposed to community compensatory or converted bonuses, the less proficient players are provided the same expected value as the skilled players, but in a way that is transparent to the skilled players (so as not to detract the skilled players' enjoyment of future games as mathematically meaningless).

Figure 10:
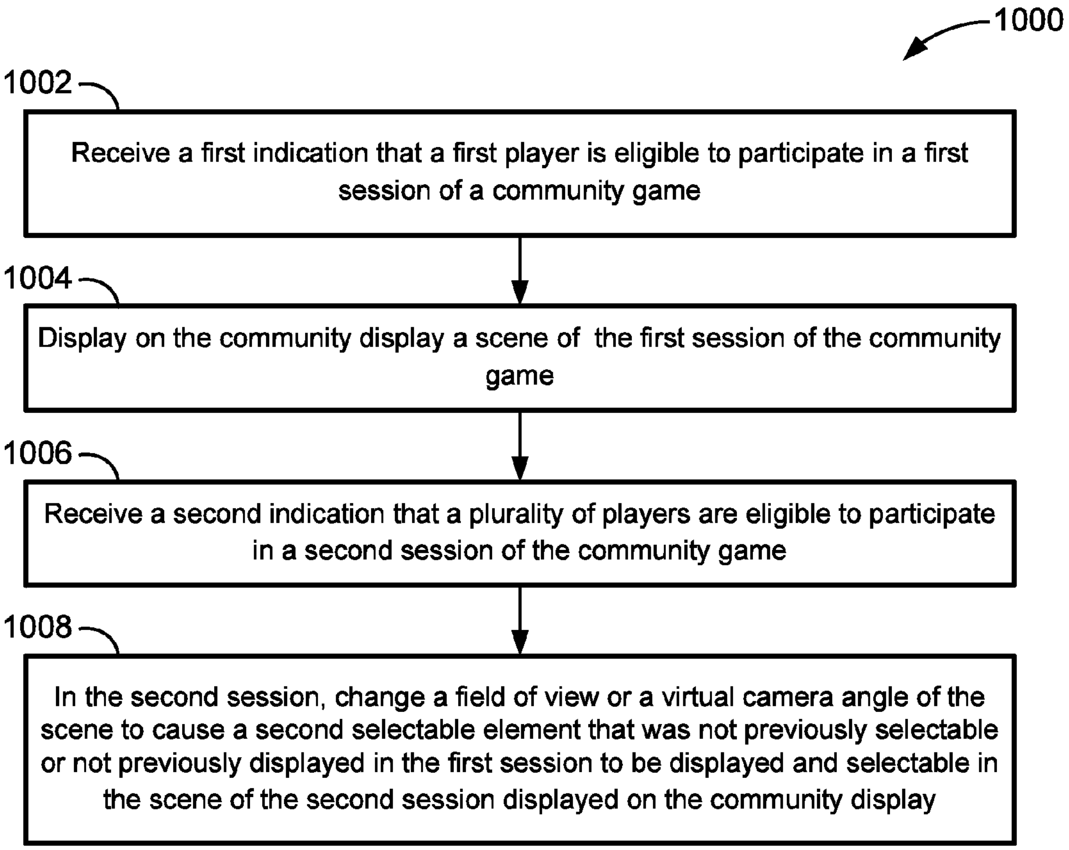
FIG. 10 is a flowchart of an algorithm that adaptively changes a field of view or a virtual camera angle of a scene as a function of the number of players participating in any of the community games disclosed herein.

FIG. 10 is a flowchart diagram of an algorithm 1000 that can be executed by the controller 42 and/or a controller in the external systems 46. The algorithm 1000 receives a first indication that a first player (or a first set of players) is eligible to participate in a first session of a community game (1002), and displays on the community display 900 a scene of the first session of the community game (1004). The algorithm 1000 receives a second indication that a plurality of players (or a second set of players that are greater in number compared to the first set of players or have a different combination of players even though the number of players are the same in both the first and second set of players) are eligible to participate in a second session of the community game (1006). The algorithm 1000 changes a field of view or a virtual camera angle of the scene of the second session to cause a second selectable element that was not previously selectable or not previously displayed in the first session to be displayed and selectable on the community display in the second session (1008). Although the first session has been described as having a first player and the second session has been described as having a plurality of players, the first session generally has a fewer number of participating players than the second session. Thus, for example, the first session can have three participating players, while the second session has seven participating players. The use of the terms "first" versus "plurality" of players is intended to refer to the fact that a different number of players or a different combination of players are participating in the first and second sessions. Other functions or features of the algorithm 1000 are described above in connection with FIGS. 5-9.

Figure 11:
FIG. 11 is a flowchart of an algorithm that makes a cooperatively selectable element available as more players join in participation in a community game and awards a cooperative award to any or all of the participating players upon selection of the cooperatively selectable element.

FIG. 11 is a flowchart of another algorithm 1100 that can be executed by the controller 42 and/or a controller in the external systems 46. The algorithm 1100 receives a first indication that a first player (or a first set of players) is eligible to participate in a first session of a community game (1102). The algorithm 1100 configures the selectable element to be selectable by the first player (1104). The algorithm 1100 displays on the community display a scene of the first session of the community game (1106). The algorithm 1100 receives a second indication that a second set of players (which can be greater in number than the first set of players or can have a different combination of players with the same number of players in the first and the second set) is eligible to participate in a second session of the community game (1108). The algorithm 1100 portrays a cooperatively selectable element in the scene of the second session on the community display 900 (1110). The algorithm 1100 receives a first input from the first player indicating that a first of the players has selected the cooperatively selectable element in the second session (1112). The algorithm 1100 receives a second input from a second of the players indicating that the second player has selected the cooperatively selectable element in the second session (1114). The algorithm 1100 provides a cooperative award (if applicable) to the first player, to the second player, or to both in the second session (1116). Again, as discussed above in connection with FIG. 10, the first set of players can have a fewer number of players compared to the second set of players, or both the first and the second sets can have the same number of players but a different combination of players such that at least one player in the second set is not in the first set. Other functions or features of the algorithm 1100 are described above in connection with FIGS. 5-9.

Figure 12:
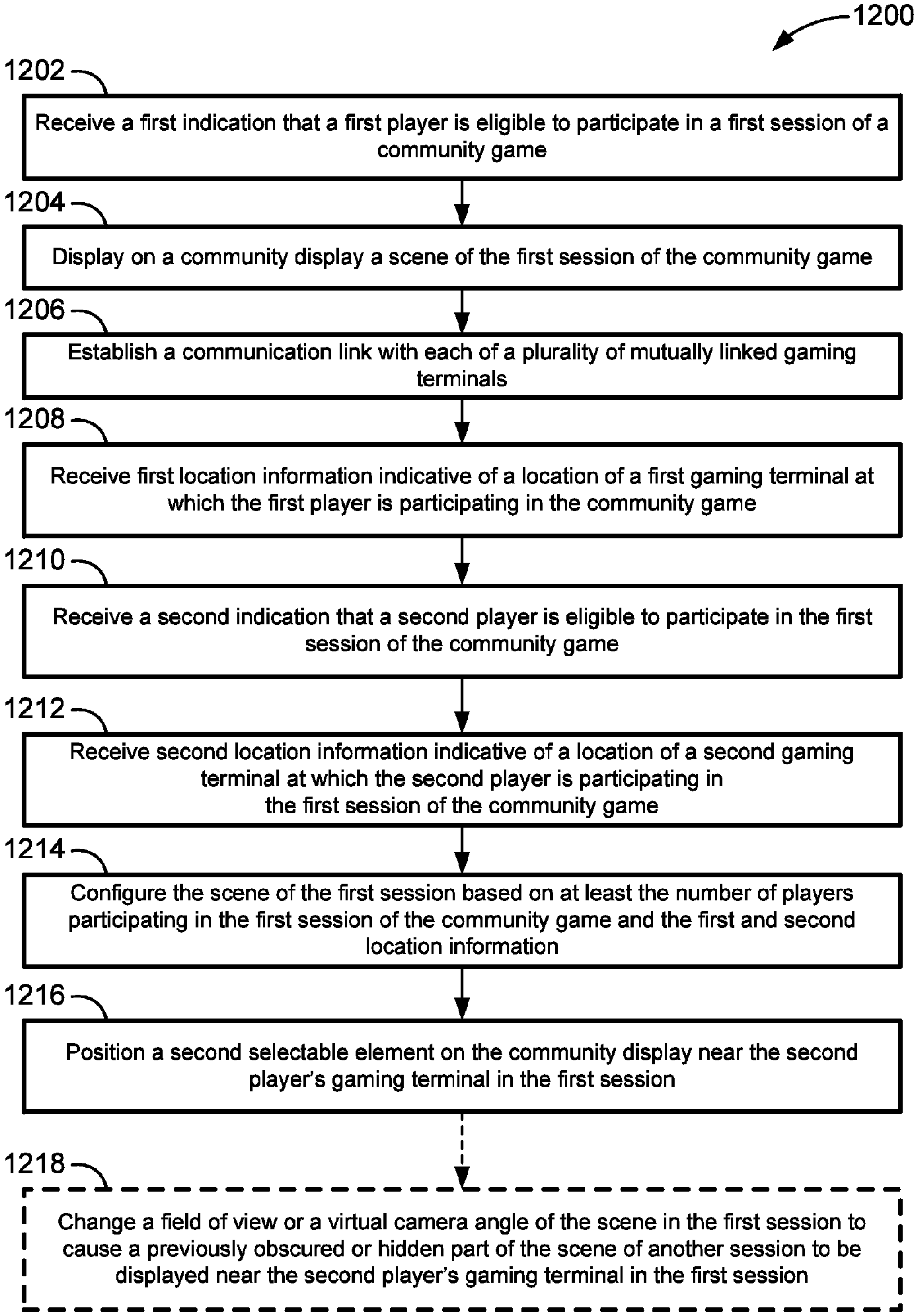
FIG. 12 is a flowchart of an algorithm that adaptively changes a scene displayed on a community display based on the location of the gaming terminals of the participating players.

FIG. 12 is a flowchart of yet another algorithm 1200 that can be executed by the controller 42 and/or a controller in the external systems 46. The algorithm 1200 receives an indication that a first player is eligible to participate in a first session of a community game (1202), and displays on a community display 900 a scene of the first session of the community game (1204). The algorithm 1200 establishes a communication link with each of multiple gaming terminals that are mutually linked to one another (1206). The algorithm 1200 receives first location information indicative of a location of a first of the gaming terminals at which the first player is participating in the first session of the community game (1208). The algorithm 1200 receives a second indication that a second player is eligible to participate in the first session of the community game (1210). The algorithm 1200 receives second location information indicative of a location of a second of the gaming terminals at which the second player is participating in the community game (1212). The algorithm 1200 configures the scene of the first session based on the number of players participating in the community game (which includes the first and the second players and can include even more players) and the first and second location information (1214). The algorithm 1200 positions a second selectable element on the community display 900 proximate to the second player's gaming terminal in the first session and distal from the other players' respective gaming terminals (1216). Optionally, the algorithm 1200 changes a field of view of a virtual camera angle of the scene in the first session to cause a previously obscured or hidden part of the scene of another session to be displayed proximate to the second player's gaming terminal in the first session (1218).

Alternately, instead of adapting a community game based on the number of players, aspects of the present disclosure can adapt a community game based on the number of gaming terminals linked or networked together, such as shown in FIG. 9. In these aspects, generally speaking, when a gaming establishment configures the floor by arranging gaming terminals and gaming machines thereon, it has a number of different configurations to select from. For example, a gaming terminal or machine can be configured as a standalone terminal playable by a single player, and can optionally be linked via a network to a progressive game, for example. The gaming terminal can be a physical device, such as the gaming terminal 10, or a virtual device accessible over a remote network, such as the Internet. As used herein, a gaming terminal can refer to a physical gaming terminal or a virtual gaming terminal. A bank of gaming terminals can include any combination of physical and virtual gaming terminals. When referring to a physical arrangement or configuration of gaming terminals, the gaming terminals are physical devices, like the gaming terminal 10. Or, two gaming terminals can be configured for a two-player wagering game and either physically arranged back-to-back or side-by-side. Less common are banks of more than two gaming terminals, and these aspects are intended to encourage gaming establishments to increase the size of the banks of gaming terminals by offering a richer, more dynamic or qualitatively different wagering game experience as more gaming terminals are added. Examples below focus on changing the type of community game that is portrayed on the gaming terminals, such as portraying an individual competitive head-to-head type community game when only two gaming terminals are banked together versus portraying a cooperative (non-competition type) community game when more than two gaming terminals are banked together. Another example involves adding more selectable elements (optionally associated with higher award values) that can be selected by the players as more gaming terminals are added. A gaming terminal can be added by physically installing a new gaming terminal next to an existing bank of two or more networked gaming terminals and connecting the new gaming terminal to a host server that hosts the community game, or activating a new virtual gaming terminal as part of the bank and configured to participate in the community game conducted on the bank of existing gaming terminals, or activating a dormant or disabled physical or virtual gaming terminal so that it connects and is recognized by the host server as now being part of the bank of networked gaming terminals. New game experiences can be unlocked as more networked gaming terminals are added, such as a community immersion bonus game when a minimum of four gaming terminals are banked together. Premium services can be made available when a minimum threshold number of networked gaming terminals are banked together, such as a metagame subscription or a metabonus game can be made available when the threshold has been reached. Alternately, portal gaming can be made available when a threshold number of networked gaming terminals are banked together. These and other examples will be described in more detail below.

A controller, such as a controller of a host server in the external systems 46, determines a number of gaming terminals that are communicatively linked together to provide a community game on one or more displays controlled by each of the number of gaming terminals or by the controller. Each gaming terminal can be assigned a unique identifier, such as an IP or MAC address or other identification information, which uniquely differentiates a gaming terminal from all others installed and configured in a gaming establishment. When multiple networked gaming terminals are banked together and communicatively linked together, either directly or via the host server in the external systems 46, the host server maintains a record of the identifiers associated with each gaming terminal in the bank and associates in the record a community game with all gaming terminals in the bank. By communicatively linked together, it is meant that each gaming terminal, whether physical or virtual, can communicate electronic data between itself and any other gaming terminal in a bank of gaming terminals and/or between itself and the external systems 46, which may comprise the host server, over a network. As used in these examples, a bank of gaming terminals refers to a grouping or network of physical or virtual gaming terminals that are associated with a common community game that can be played by more than one player. In some examples, gaming terminals in a bank are physically contacting one another, such as in a back-to-back arrangement or a side-by-side arrangement. The one or more displays can refer to multiple displays in the case where each gaming terminal has its own display that displays the community game (or part thereof) or to a single display that is shared by all of the gaming terminals in a bank on which the community game is displayed. As described below, when multiple gaming terminals are physically arranged in a side-by-side configuration, and each of the gaming terminals includes a video display that has a common size and resolution, the video displays (even though they comprise more than one) can appear to form a substantially seamless, unitary display particularly in configurations where there is little or no bezel surrounding the viewable area of the screen of the video display.

The community game is displayed on the one or more displays. The community game has a first game category type and a first set of functionality and content features. A game category type refers to whether the players compete or cooperate or collaborate to accumulate awards in the community game. A game category type includes head-to-head or competitive in which the players compete against one another to accumulate awards in the community game. A wagering game modeled after the well-known game BATTLESHIP is an example of a head-to-head or competitive or individual competition type of wagering game. Another game category type can include cooperative (sometimes also called collaborative) in which the players cooperate together to accumulate awards in the community game. An example of a cooperative type wagering game is MONOPOLY BIG EVENT available from WMS Gaming, the assignee of the present disclosure. Another game category type can include team in which groups of players form teams and compete as teams against other teams to accumulate awards for their respective team in the community game. Teams can either cooperate (cooperative-team type) or compete (competitive-team type) against one another in a team category. An example of a competitive-team type wagering game is PIRATE BATTLE available from WMS Gaming, the assignee of the present disclosure.

Awards can be awarded differently in different game categories. For example, in a competitive-type community game, a greater award can be awarded to the player who wins the competition; the other player is awarded a lesser award or possibly nothing. In a cooperative-type game, the award can be shared among the players who cooperated to achieve it. In a cooperative or competitive team-type game, the entire and/or a bonus award can be awarded to the team who cooperated to achieve it, and the members of the team can share the team award or pool their awards to increase their odds of achieving a larger award. A lesser award or possibly no award can be awarded to those team(s) which do not win a competition in a competitive team community game.

A set of functionality and content features refers to the software functionality of the community game and the graphical content and game features of the community game. Identical wagering games, whether primary or base, bonus, progressive, or community (even though played on different gaming terminals or banks of gaming terminals), have the same sets of functionality and content features. For example, a set of functionality can refer to a new bonus game that is not available in a different set of functionality and content features. Another example of functionality can correspond to a standalone community game or to a portal community game available over a communications network. The portal community game can be made available only when a minimum number of gaming terminals have been banked together. Another example of functionality can correspond to whether a community game lacks or has a metagame ruleset. A metagame ruleset uses out-of-game information or resources to affect in-game decisions. The out-of-game information or resources corresponds to information or resources that are external to a given community game, and in-game decisions correspond to decisions made within a given community game.

A content feature refers to graphical content associated with a wagering game or a wagering game feature or both a graphical content and a wagering game feature. The graphical content can refer to the appearance, location, type, and animation profile of graphical elements or symbols that appear in the community game, which can be associated with randomly determined awards and can be selectable by players of the community game. For example, game content can correspond to one or more new symbols each associated with a randomly selected outcome, such that none of the symbols is available in a different set of functionality and content features. Awards associated with the new symbols can have a higher value compared to awards associated with symbols in a different set of functionality and content features. Game content in one set of functionality and content features can be locked and unavailable in a corresponding community game but the game content in another set of functionality and content features can be unlocked and available in a modified community game (such as when one or more additional gaming terminals are added). Game features refer to any conventional feature available in a wagering game, including a bonus game, a progressive game, a community game, and the like, as those terms are ordinarily understood in the art of wagering game systems. For example, a feature can correspond to a new multiplier that is not available in a different set of functionality and content features. Numerous other known and conventional features include wild symbols, symbol upgrades, special awards, win-deferral, replay bonus, enhanced payline, scrolling indicia, side-wagering, symbol matching, mystery pay, symbol shuffle, concealed bonus, variable bonus payout, event substitution, rotating wild, multiple level progressive, and the like. In a general aspect, the functionality and content features differ as a function of the number of gaming terminals banked together. In general, as more gaming terminals are banked together, a richer or enhanced game experience is provided in some of the exemplar forms discussed herein.

The controller, such as the controller in the external systems 46, or another controller, such as a controller in one of the gaming terminals or in another remote server, detects that one or more additional physical or virtual or physical and virtual gaming terminals (some or none or all of which can have an associated additional display) are added by establishing communication links among the external systems 46 and the additional gaming terminal(s) and the original gaming terminals. For example, in a gaming establishment, the operator of the gaming establishment can physically install a new gaming terminal next to an existing bank of gaming terminals and register or link the new gaming terminal so that the external system 46 recognizes the new gaming terminal as part of the existing bank of terminals. Once the new gaming terminal is installed, it can transmit its unique identifier as discussed above to the host server, such as the external system 46, which recognizes the new identifier and associates it with a group of identifiers that are already associated with an existing bank of gaming terminals that are mutually linked to a community game.

In response to a new physical or virtual gaming terminal being detected, the controller, such as the external system 46, changes the first game category type to a second game category type or the first set of functionality and content features to a second set of functionality and content features. In other words, when one or more new gaming terminals are added to an existing bank of gaming terminals, either the game category can change or the functionality and content features can change or both. The second game category type differs from the first game category type, and the second set of functionality and content features differs from the first set of functionality and content features insofar as the second set of functionality and content features has at least one functionality or content feature that is enhanced relative to the first set of functionality and content features. Examples of an enhanced set of functionality and content features are described in more detail below. In general, enhanced can be mean that the awards available in the second set of functionality and content features are more valuable than the awards available in the first set of functionality and content features. The change prompted by the addition of one or more new gaming terminals results in a modified community game having the second game category type or the second set of functionality and content features. The modified community game can be an enhanced version of the original community game or the modified community game can be a new or different community game from the original community game that was conducted on the original bank of gaming terminals.

The controller or another controller causes the modified community game to be displayed on the one or more displays and optionally on the additional display. Thus, if the new gaming terminal has an additional display, the modified community game can be displayed on the displays of the original bank of gaming terminals (before the new gaming terminal(s) were added). Or, if the display that displays the community display is a single display, it can be replaced with a larger display that spans across the width of the bank of gaming terminals including the new gaming terminal(s). Alternately, if the community game is displayed on a single, wide community display, the modified community game can be displayed on the same wide community display as additional gaming terminals are added. For example, if the physical arrangement of the gaming terminals is circular, the same community display can be used as more gaming terminals are added to form a circular configuration.

Figure 13A:
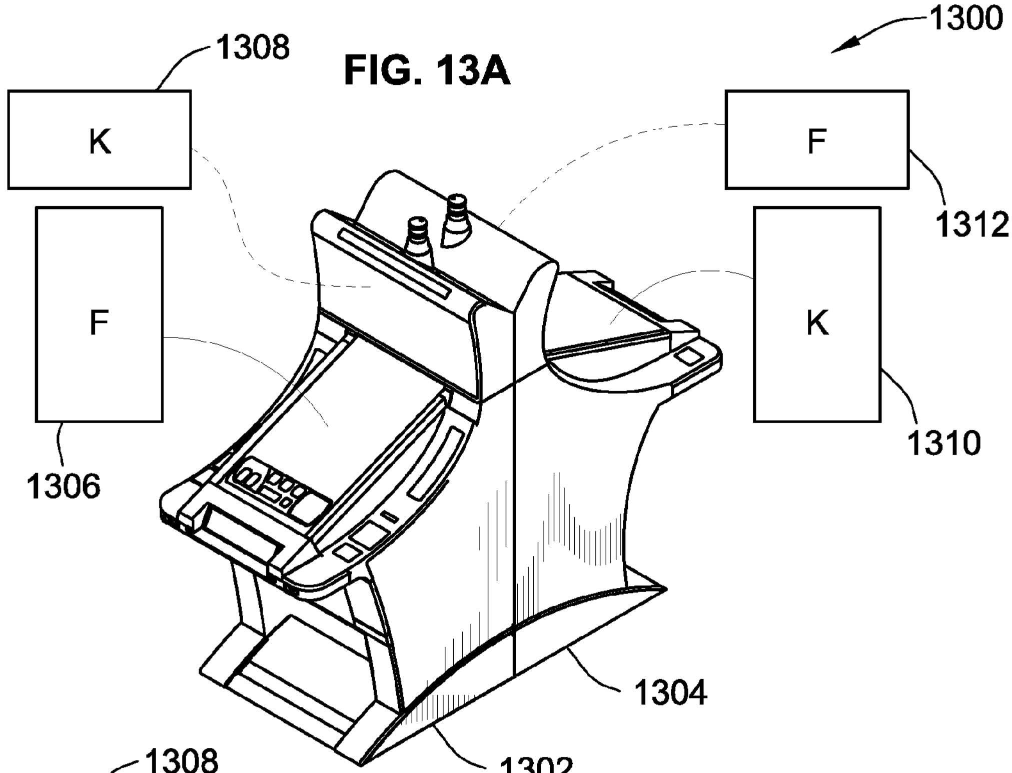
FIG. 13A is a perspective view of a back-to-back configuration of two gaming terminals configured to display a two-player community game on their respective displays along with callouts indicating a head-to-head competitive play among the two players.

FIG. 13A illustrates an exemplary first configuration 1300 of a bank of gaming terminals including a first gaming terminal 1302 and a second gaming terminal 1304 physically arranged back-to-back relative to one another. The first gaming terminal 1302 includes a primary display 1306 and a secondary display 1308, and the second gaming terminal 1304 includes a primary display 1310 and a secondary display 1312. By "back-to-back" it is meant that the two secondary displays 1308, 1312, for example, face away from one another in opposite directions. In this first configuration 1300, a community game is displayed on the primary and/or the secondary displays 1306, 1308, 1310, 1312. The community game is of a first game category type, or in this example, a competitive game in which players at the first and second gaming terminals 1302, 1304 compete against each other for an award in the community game. This type of competitive wagering game is referred to as a "head-to-head" game because the players are directly competing against one another in the community game for the same awards. The letters F and K shown in the primary and secondary displays 1306, 1308, 1310, 1312 indicate different themes or enemies that each player is battling against. For example, if the theme of the community game is STAR TREK, the primary display 1306 can depict a theme corresponding to the Federation ship, whereas the secondary display 1308 can depict a theme corresponding to the Klingons. In this example, the player at the gaming terminal 1302 can have an avatar, displayed on the primary display 1306, from the Federation ship which is battling the Klingons displayed in the secondary display 1308. By contrast, the other player at the second terminal 1304 can have an avatar from the Klingons who is battling the Federation ship. The battle can feature selectable elements, each associated with different randomly selected outcomes, which the players can select for potentially winning awards.

Figure 13B:
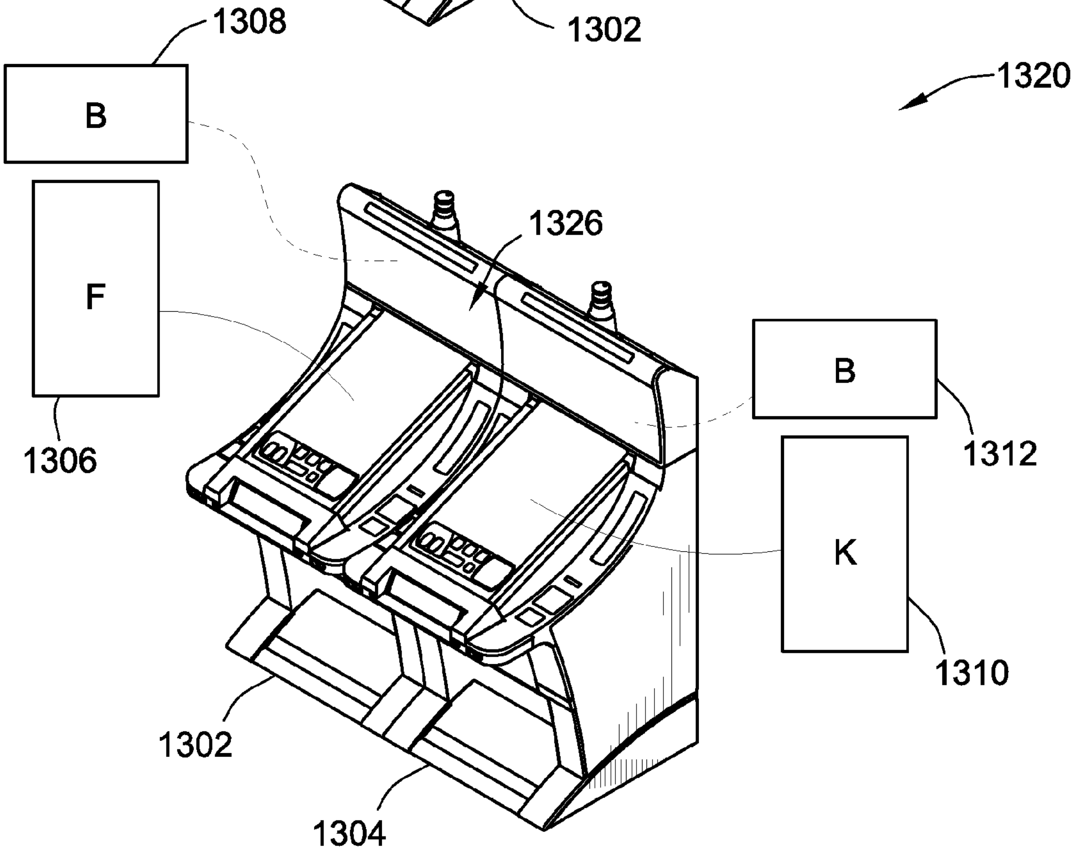
FIG. 13B is a perspective view of the gaming terminals shown in FIG. 13A in a side-by-side configuration with a common display formed by the two displays of the side-by-side gaming terminals depicting a competitive-type community game.

FIG. 13B illustrates a second configuration 1320 in which the gaming terminals 1302, 1304 shown in FIG. 13A have been physically rearranged from a back-to-back configuration 1300 to a side-by-side configuration 1320. This configuration 1320 lends itself to expanding the number of gaming terminals to the bank of gaming terminals 1302, 1304, so the type of community game portrayed on the side-by-side gaming terminals 1302, 1304 shown in FIG. 13B can be changed from competitive (as shown in FIG. 13A) or to a different type, such as cooperative in which the players cooperate with one another to achieve an award in the community game as modified in the second configuration 1320. For example, theme B shown on the secondary displays 1308, 1312 can represent a common enemy that both the player at the gaming terminal 1302 (whose avatar may be associated with the Federation ship) and the player at the gaming terminal 1304 (whose avatar may be associated with the Klingons) are mutually cooperating to defeat. The two secondary displays 1308, 1312 visually appear to form a single display 1326 that is substantially seamless, which means that although both displays 1308, 1312 may lack bezels, there may be a barely visibly perceptible line between the two displays 1308, 1312, but the graphics and animations can span both displays 1308, 1312 such that they appear to be a single display 1326. As mentioned above, the secondary displays 1308, 1312 do not have to be integrated into the cabinets of the gaming terminals 1302, 1304, but rather can be positioned above the cabinets of the gaming terminals 1302, 1304 as a community display that is coupled to one or both of the gaming terminals 1302, 1304 or to the external system 46 or both. Such a configuration allows either or both of the gaming terminals 1302, 1304 or the external system 46 to drive the video data that is to be displayed on the community display.

Figure 13C:
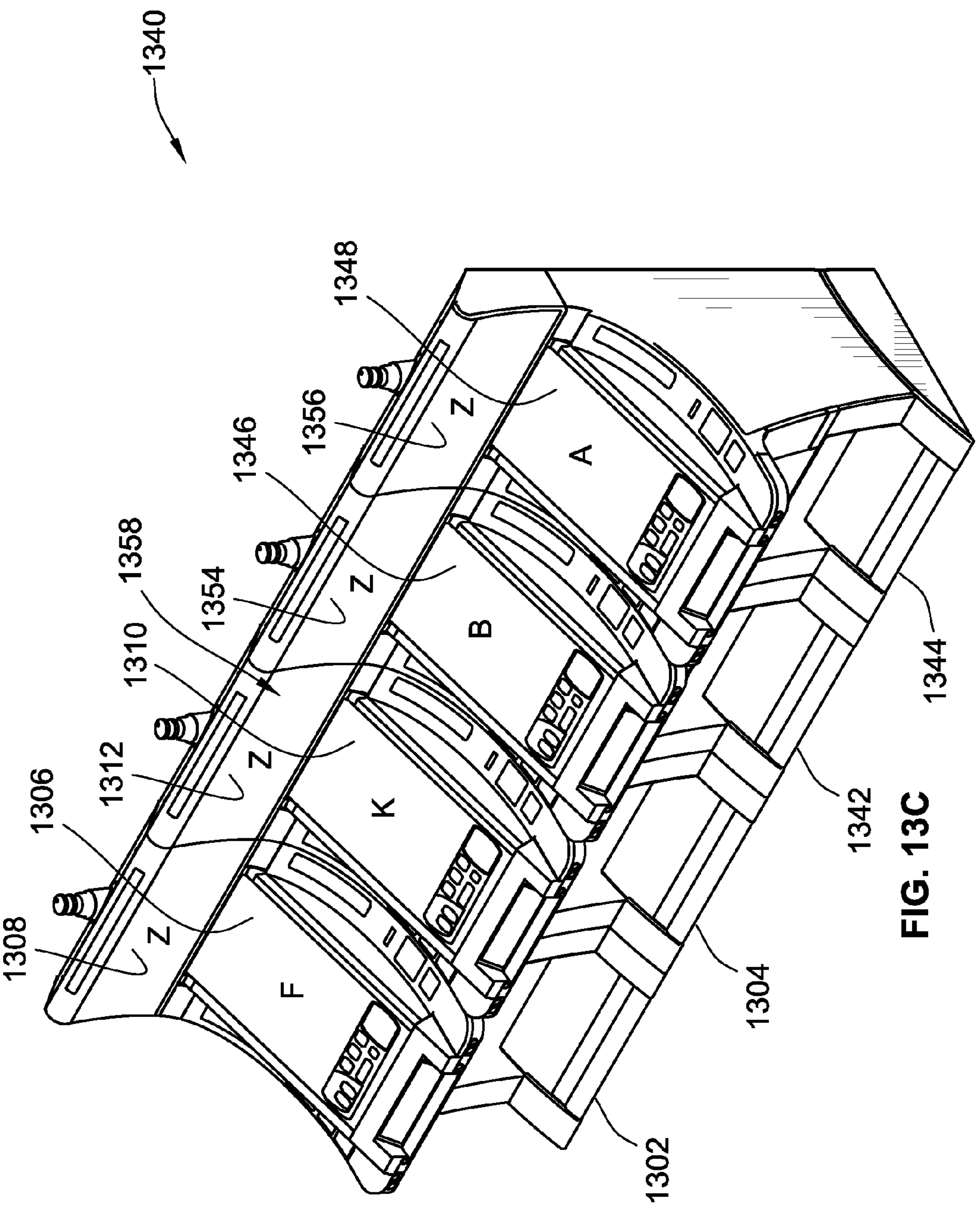
FIG. 13C is a perspective view of a new configuration showing four gaming terminals, including the two gaming terminals shown in FIG. 13B, in which the community game type has changed from competitive to cooperative or team-based as a result of the additional gaming terminals.

In FIG. 13C, a third configuration 1340 is shown in which two additional gaming terminals 1342, 1344 to the existing bank of gaming terminals 1302, 1304 shown in FIG. 13B. Although two additional gaming terminals 1342, 1344 are shown as being added, a single additional gaming terminal can be added in this configuration. Now, in this configuration 1340, there are four secondary displays 1308, 1312, 1354, 1356 that are physically arranged side-by-side to form visually a single, substantially seamless display spanning across the four gaming terminals 1302, 1304, 1342, 1344. In this configuration 1340, the type of the community game is changed from competitive (shown in the first configuration 1300 in FIG. 13A) to a competitive-team game in which groups of the players at the gaming terminals 1302, 1304, 1342, 1344 form teams (at least two players per team) and compete as teams against other teams to achieve a team award in the modified community game portrayed on the displays 1308, 1312, 1354, 1356. In this example, the modified community game has a theme "Z" and each of the players are represented by avatars or graphical elements F, K, B, and A. Two of the four players (such as represented by F and K) form one team, and compete against another two-player team (represented by B and A) to fight a common enemy represented by Z. The players in the first team (F and K) cooperate with one another to accumulate awards shown on the community display system 1358, while the players in the second team (B and A) also cooperate with one another to accumulate those same awards. Thus, while the players in any given team cooperate with one another to accumulate awards, the team itself competes with other teams to accumulate the most awards in the community game. The winning team at the end of a round can be awarded a bonus or additional team award for being the winning team. The member players of each team can, at least in part, share the team awards accumulated by the team. The losing team(s) can be awarded a lesser team award, or none at all, and the member players of each losing team can, at least in part, share whatever team award is awarded to the losing team.

As mentioned above, although the example in FIG. 13C shows four gaming terminals, a minimum of three gaming terminals can be required to invoke the team category type. For example, if an existing configuration of a bank of two gaming terminals portrays a community game of the cooperative type, and one new gaming terminal is added to such a configuration, the game category type of the modified community game can be changed from cooperative to a team (cooperative- or competitive-team) game in which groups of players of the modified community game form teams whose objective is to achieve a team award in the modified community game.

To change the game category type, a minimum number of physical and/or virtual gaming terminals can be required. For example, to change the game category type from competitive to cooperative, a minimum number of three or four gaming terminals can be required to be banked together to form a cooperative community game.

Generally speaking, in some aspects of the present disclosure, a community game associated with a given bank of gaming terminals has a game category type that defines whether the players compete or cooperate to accumulate awards in the community game. No particular preference is expressed as to whether more or fewer physical or virtual gaming terminals are required to change the type between cooperative or competitive or vice versa. The examples provided herein are merely illustrative of many possible permutations and configurations of gaming terminals. As more physical or virtual gaming terminals are added, the game category type changes such that players accumulate awards differently than how players accumulate awards in community games having fewer gaming terminals banked together. At least three different and distinct game category types are discussed herein: head-to-head in which the players compete against one another to accumulate awards such that one player is awarded the entire value of an award; cooperative in which the players cooperate with one another in the community game to accumulate awards such that an award is shared among more than one of the participating players; or team in which groups of players form teams that compete against one another to accumulate bonus or extra team awards that can be shared or split among the player members of the team. A community game having a team game category type can include a team multiplier that is applied to the award awarded to the team. The team multiplier can be unavailable in another community game having fewer gaming terminals banked together.

In addition to or instead of changing the game category type as the number of physical or virtual gaming terminals banked together in a community game is increased or decreased, the functionality and/or content and/or features offered in each community game can be changed. For example, for a given community game, a first set of features can define (a) awards associated with randomly selected outcomes of the community game and (b) graphical symbols associated with the awards and configured to be displayed on the community display(s). When the external system 46 detects that one or more additional physical or virtual gaming terminals has or have been added to the existing bank of gaming terminals, the first set of features can be changed to a second set of features that differs from the first set of features in that the second set of features defines enhanced (e.g., having a higher monetary value) awards associated with randomly selected outcomes of the modified community game or a greater number of graphical symbols associated with the enhanced awards. The graphical symbols can be selected by players of the modified community game. In the first set of features, some or all of the graphical symbols can be hidden or partially obscured from the players in the community game. Alternately, in the second set of features, the graphical symbols can be visible or partially visible to the players in the modified community game. An example of this aspect is shown in FIGS. 14A-C.

Figures 14A, 14B, 14C:
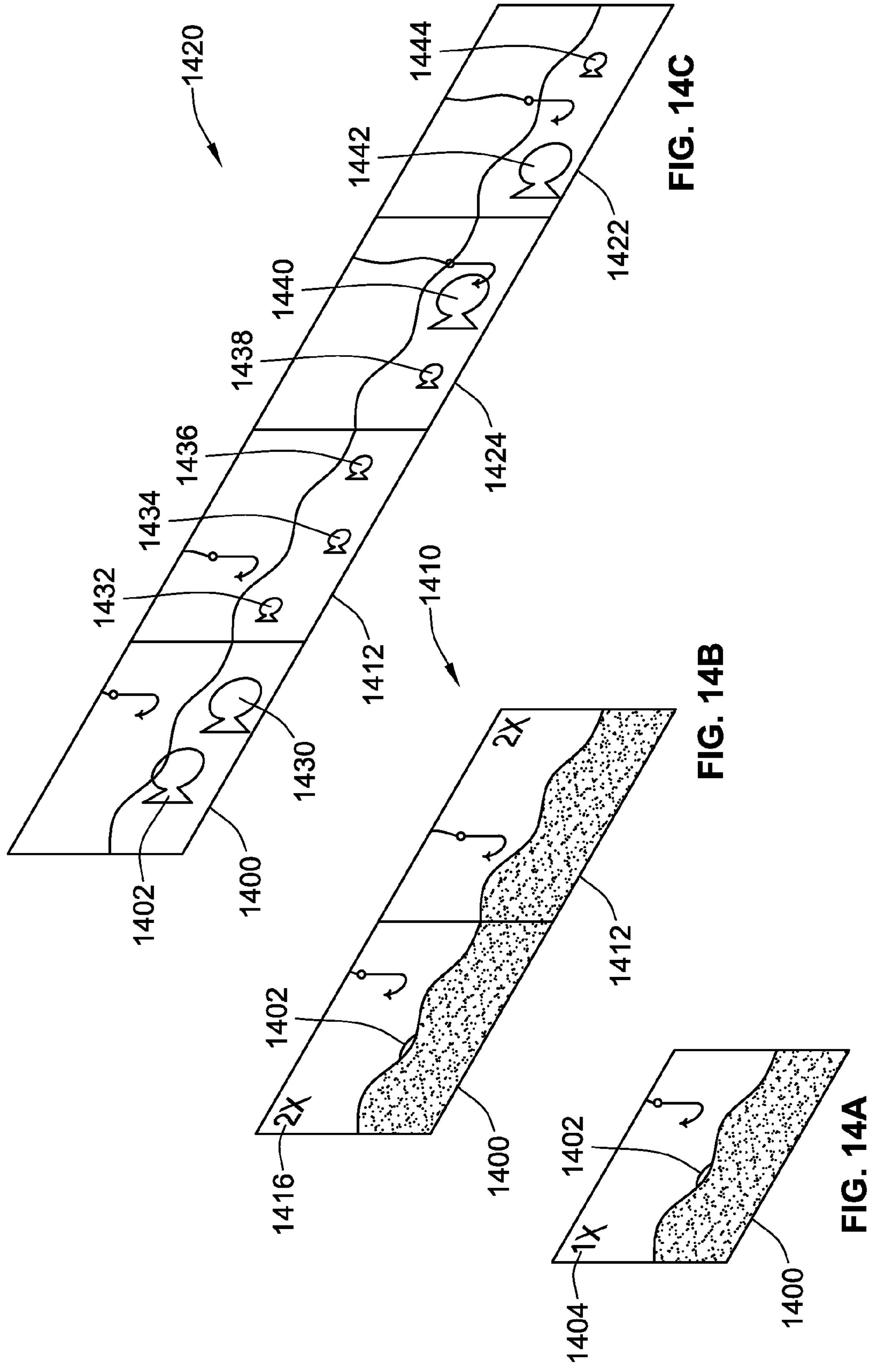
FIG. 14A is an example screen shot of a community game displayed on a gaming terminal linked to at least one other gaming terminal in which one of the symbols is partially obscured.
FIG. 14B is an example screen shot of a modified community game displayed on at least two gaming terminal displays, showing a multiplier that is applied to awards accumulated in the modified community game.
FIG. 14C is an example screen shot of a further modified community game displayed on at least four gaming terminal displays, revealing game symbols or elements that can be accumulated for potential awards.

In FIG. 14A, an example configuration 1400 is shown in which a single gaming terminal displays a wagering game having a selectable element 1402 represented as a graphical symbol that is partially obscured from view. In this example, the graphical symbol represents a fish, but the player cannot gauge the size of the fish as the majority of the fish is concealed beneath the water. In this example, the bigger the fish, the larger the potential award (e.g., having a greater monetary value) is. Further, a multiplier 1404 of 1× is shown, meaning that if the player successfully selects the selectable element 1402, no enhancement to whatever award may be randomly associated with that selectable element 1402 will be made to any such award.

However, in FIG. 14B, the operator of the gaming establishment has added a second gaming terminal having a display 1412 side-by-side the original gaming terminal 1400 to form a second configuration 1410. Although the selectable element 1402 in this two-terminal configuration is still partially obscured, the multiplier 1416 has been increased from 1× to 2×, meaning that either player of this community game can double their value of any award associated with the selectable element 1402.

Finally, in FIG. 14C, the operator of the gaming establishment has added two more physical gaming terminals 1422, 1424 side-by-side the two gaming terminals 1400, 1412 to form a third configuration 1320 of a bank of four gaming terminals portraying a community game. Unlike the configurations shown in FIGS. 14A and 14B, in this third configuration 1420, the selectable elements 1402-1444 are now visible, along with their relative size. The players of this community game can see the relative size of the selectable elements 1402-1444 (each of which is associated with a randomly determined outcome, such as an award), increasing the excitement and sense of anticipation for the players. Players in this third configuration 1420 can form teams of two or more players that compete against one another to hook the biggest fish (represented by selectable elements 1402-1444). The team that hooks the most or biggest fish (e.g., the highest award value) can be awarded a team bonus, which can be shared, at least in part, among the member players of the team.

Aspects of the present disclosure also refer to a computer-implemented method, which can be wholly or partly incorporated wholly or partly into any aspect or combination of aspects described herein. One or more controllers, such as the external systems 46, configures a bank of networked gaming terminals (two or more) to be eligible to participate in a first community game. One or more gaming additional physical or virtual terminals are added to, or subtracted from, the existing bank of networked gaming terminals. In response, the one or more controllers reconfigure the bank of networked gaming terminals (reflecting the newly added or subtracted gaming terminals) to be eligible to participate in a second community game that is different from the first community game.

When the bank of networked gaming terminals is configured to be eligible to participate in the first community game, the first community game can be triggered during play of one or more wagering games played via the bank of networked gaming terminals. The first community game can be displayed on at least one display device. The display device can be a single, wide display device, or multiple display devices arranged next to each other, such as described above without bezels so that there is little to no visual perception of any seams between adjacent display devices.

When the bank is configured to be eligible to participate in the second community game, the second community game can be triggered during play of the one or more wagering games played via the bank of networked gaming terminals. The second community game can be displayed on the at least one display device.

The first community game and the second community game can be of different types. Examples of types include a non-competition type (which includes the cooperative type mentioned above), individual competition type (such as the head-to-head competitive type mentioned above), and team competition type (a subset of the team type mentioned above). In the non-competition type of community game, the gaming terminals can be eligible to participate in the community game simultaneously, but each gaming terminal retains its own free spin(s) and resulting individual awards. Alternately, each gaming terminal can be eligible to participate in the community game simultaneously and shares one or more free spins and resulting awards with other gaming terminals. In still another example, gaming terminals can take turns picking from a common pick field, and share in the accumulated awards. Examples of these and other suitable community games can be found in WO2005113088, entitled Bank Wagering Game, published Dec. 1, 2005. The non-competition type includes the cooperation type mentioned above.

The bank of networked gaming terminals can include at least four physical and/or virtual gaming terminals with respect to the team competition type of community game. For example, each team is formed by at least two gaming terminals.

The first and second community games can differ in that game content available for presentation in the second community game is unavailable for presentation in the first community game. Alternately, a game play mechanic available for use in the second community game is unavailable for use in the first community game. The term "mechanic" has the meaning ascribed in the field of gaming. In general, a mechanic refers to a construct of rules designed to produce the game play for a game, such as a wagering game When the bank is configured to be eligible to participate in the first community game, the gaming terminals in the bank can be arranged in a first physical arrangement. Examples of physical arrangements include a back-to-back arrangement, a side-by-side linear arrangement (in which the gaming terminals are physically arranged next to one another to form a straight row of terminals), a side-by-side curved arrangement (in which the gaming terminals are physically arranged along a curve), and a circular arrangement (in which the gaming terminals are physically arranged in a circular layout). When an additional one or more new physical or virtual gaming terminals are added, or one or more existing physical or virtual gaming terminals are subtracted from the bank of networked gaming terminals, the remaining gaming terminals in the bank are rearranged in a second physical arrangement that is different from the first physical arrangement. For example, if the first arrangement includes four gaming terminals arranged in a side-by-side curved arrangement, and two gaming terminals are removed, the remaining two gaming terminals can be rearranged in a back-to-back arrangement for an individual competition type community game.

Each of FIGS. 10-14C, described by way of example above, represents one algorithm that corresponds to at least some instructions executed by the controller 42 and/or external systems 46 in FIG. 2 to perform the above described functions associated with the disclosed concepts. Any of the methods described herein can include machine or computer-readable instructions for execution by: (a) a processor, (b) a controller, such as the controller 42 or external systems 46, and/or (c) any other suitable processing device. Any algorithm, software, or method disclosed herein can be embodied as a computer program product having one or more non-transitory tangible medium or media, such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.).

It should be noted that the algorithms illustrated and discussed herein as having various modules or blocks that perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular embodiments and applications of the present disclosure have been illustrated and described, it is to be understood that this disclosure is not limited to the precise construction and compositions disclosed herein and that various modifications, changes, and variations can be apparent from the foregoing descriptions without departing from the spirit and scope of the invention as defined in the appended claims.

What is claimed is:

1. A method of adapting an appearance of a community game based on the number of participating players, comprising:

receiving at a controller a first indication that a first player is eligible to participate in a first session of a community game that has a theme and a first selectable element and configured to be played by multiple participating players;

displaying on one or more community video displays at least a portion of the first session of the community game, the portion including a scene portraying images related to the theme and representative of the first selectable element;

receiving at the controller a second indication that a second set of players are eligible to participate in a second session of the community game; and responsive to receiving the second indication, changing a field of view or a virtual camera angle of the scene to produce an altered scene and to cause a second selectable element that was not previously selectable or not previously displayed in the first session to be displayed and selectable in the scene displayed in the second session on the one or more community video displays; and displaying on the one or more community video displays the altered scene of the second session of the community game.

2. The method of claim 1, wherein the second selectable element is hidden or obscured from view on the one or more community video displays in the first session, wherein the changing the field of view or the virtual camera angle causes the second selectable element to appear in the field of view of at least the second player.

3. The method of claim 2, wherein the changing the field of view or the virtual camera angle includes changing the view of the scene by zooming out or panning the scene to expand or shift the field of view such that the second selectable element is brought into the field of view of at least the second player.

4. The method of claim 3, wherein, responsive to the zooming out or panning, a selectable area corresponding to the first selectable element does not diminish in size.

5. The method of claim 2, wherein the changing the field of view or the virtual camera angle includes changing the virtual camera angle about an object portrayed in the scene to reveal the second selectable element that was previously obscured in the first session by the object in the field of view during the displaying.

6. The method of claim 1, wherein the number of selectable elements displayed on the one or more video displays is proportional to the number of players participating in a session of the community game.

7. The method of claim 1, wherein the first indication includes a first indication that the first player has satisfied an eligibility criterion to participate in the first session of the community game, the method further comprising:

causing an individual wagering game to be displayed on a video display of the first gaming terminal; and during play of the individual wagering game by the first player at the first gaming terminal, indicating that the eligibility criterion has been satisfied by the first player to participate in the first session of the community game.

8. The method of claim 7, wherein the second indication includes a second indication that the second player has satisfied an eligibility criterion to participate in the second session of the community game, the method further comprising:

causing an individual wagering game to be displayed on a video display of the second gaming terminal; and during play of the individual wagering game by the second player at the second gaming terminal, indicating that the eligibility criterion has been satisfied by the second player to participate in the second session of the community game.

9. The method of claim 1, further comprising:

associating with the first selectable element a first award having a first type; and associating with the second selectable element a second award having a second type different from the first type.

10. The method of claim 9, further comprising, responsive to the first player or the second player selecting the second selectable element, awarding the second award.

11. A method of adapting an appearance of a community game based on the number of participating players, comprising:

receiving at a controller a first indication that a first player is eligible to participate in a first session of a community game that has a theme and configured to be played by multiple participating players;

displaying on one or more community video displays at least a portion of the first session of the community game that includes a scene portraying images related to the theme;

establishing a communication link with respective ones of a plurality of gaming terminals communicatively linked together, each of the gaming terminals including a video display;

receiving first location information indicative of a location of a first of the gaming terminals at which the first player is participating in the community game;

receiving at the controller a second indication that a plurality of players are eligible to participate in a second session of the community game;

receiving second location information indicative of a location of each of the gaming terminals at which the plurality of players are participating in the second session;

responsive to receiving the second indication and the second location information, making a determination whether to alter the scene of the second session based on at least the number of the plurality of players participating in the second session of the community game and the first and second location information by:

introducing a second selectable element on the community video display in the second session such that the second selectable element is displayed proximate to the gaming terminal at which one of the plurality of players is participating in the community game and distal from a gaming terminal of a non-participating player, or changing a field of view or a virtual camera angle of the scene to cause a previously obscured or hidden part of the scene of the first session to be displayed in the second session proximate to the gaming terminal at which one of the plurality of players is participating in the second session and distal from a gaming terminal of a non-participating player; and altering the scene based on the determination.

12. The method of claim 11, further comprising:

receiving location information from a handheld input device held by one of the plurality of players, in the second session the location information indicating a location in three-dimensional coordinate space and an orientation of the handheld input device in the three-dimensional coordinate space, and selection information indicating that the player has indicated that a selection has been made of the second selectable element; and responsive to receiving the location information, awarding to at least the player who has made the selection of the second selectable element an award associated with the second selectable element.

13. The method of claim 11, wherein the second selectable element is hidden or obscured from view on the one or more community video displays in the first session, wherein the changing the field of view or the virtual camera angle causes the second selectable element to appear in the field of view of the scene of the second session.

14. The method of claim 13, wherein the changing the field of view or the virtual camera angle includes changing the view of the scene by zooming out or panning the scene to expand or shift the field of view such that the second selectable element is brought into a field of view of one of the plurality of players participating in the second session.

15. A method of adapting an appearance of a community game based on the number of participating players, comprising:

determining, by a controller, that a first plurality of players are eligible to participate in the community game;

in response to determining that the first plurality of players are eligible to participate in the community game, displaying on at least one community video display device a thematic scene including a first selectable element;

determining, by the controller, that a second plurality of players are eligible to participate in the community game, the second plurality of players being different than the first plurality of players; and in response to determining that the second plurality of players are eligible to participate in the community game, changing a field of view or a virtual camera angle of the scene to cause a second selectable element that was not previously selectable or not previously displayed to be displayed and selectable in the scene displayed on the community video display device.

16. The method of claim 15, wherein the number of players in the second plurality of players is different than the number of players in the first plurality of players.

17. The method of claim 15, wherein the number of players in the second plurality of players is the same as the number of players in the first plurality of players, wherein the second plurality of players includes at least one player that is not in the first plurality of players.

* * * * *